(12) United States Patent
James

(10) Patent No.: US 9,783,315 B2
(45) Date of Patent: Oct. 10, 2017

(54) NACELLE WITH LONGITUDINAL TRANSLATING COWLING AND ROTATABLE SLEEVES

(75) Inventor: Norman John James, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 805 days.

(21) Appl. No.: 13/404,982

(22) Filed: Feb. 24, 2012

(65) Prior Publication Data

US 2013/0220435 A1 Aug. 29, 2013

(51) Int. Cl.

| | |
|---|---|
| B64D 29/00 | (2006.01) |
| B64D 29/06 | (2006.01) |
| B64D 29/08 | (2006.01) |
| F02K 1/30 | (2006.01) |
| F02K 1/32 | (2006.01) |
| B64D 27/12 | (2006.01) |
| B64D 27/26 | (2006.01) |
| F23R 3/60 | (2006.01) |

(52) U.S. Cl.
CPC .............. *B64D 29/08* (2013.01); *B64D 27/12* (2013.01); *B64D 27/26* (2013.01); *B64D 29/00* (2013.01); *B64D 29/06* (2013.01); *B64D 2027/262* (2013.01); *F02K 1/30* (2013.01); *F02K 1/32* (2013.01); *F23R 3/60* (2013.01); *Y10T 137/0536* (2015.04)

(58) Field of Classification Search
CPC ..... F02K 1/30; F02K 1/32; F23R 3/60; B64D 2027/262; B64D 27/26; B64D 27/12; B64D 29/06; B64D 29/00

USPC ............... 60/796, 797, 798, 226.1, 226.2; 244/53 B, 54

See application file for complete search history.

(56) References Cited

U.S. PATENT DOCUMENTS

| | | | | |
|---|---|---|---|---|
| 3,831,376 | A | * | 8/1974 | Moorehead ............. F02K 1/827 239/265.29 |
| 3,960,345 | A | | 6/1976 | Lippert, Jr. |
| 4,147,028 | A | | 4/1979 | Rodgers |
| 4,278,220 | A | * | 7/1981 | Johnston et al. ......... 244/110 B |
| 4,365,775 | A | * | 12/1982 | Glancy ................. B64D 29/06 244/129.4 |
| 4,449,683 | A | | 5/1984 | Gratzer et al. |
| 4,466,587 | A | * | 8/1984 | Dusa ........................ B64C 7/02 244/1 N |
| 4,549,708 | A | * | 10/1985 | Norris ........................ 244/129.4 |
| 4,613,099 | A | * | 9/1986 | Smith .................... B64D 29/06 244/129.4 |
| 4,716,724 | A | * | 1/1988 | Newton .................... F02K 1/72 239/265.29 |
| 4,825,648 | A | * | 5/1989 | Adamson ............... B64D 29/00 60/226.1 |
| 5,035,379 | A | | 7/1991 | Hersen et al. |

(Continued)

*Primary Examiner* — Pascal M Bui Pho
*Assistant Examiner* — Eric Linderman
(74) *Attorney, Agent, or Firm* — Snell & Wilmer, L.L.P.

(57) ABSTRACT

A nacelle includes at least a first cowling which at least partially defines an inlet of the nacelle and which at least partially defines an outlet of the nacelle. The first cowling can include a unitary portion that extends continuously from the inlet to the outlet. The nacelle also includes a second cowling that at least partially defines the inlet and which translates relative to the first cowling. The nacelle can include a third cowling that at least partially defines the outlet and translates relative to the first cowling.

18 Claims, 22 Drawing Sheets

(56) References Cited

U.S. PATENT DOCUMENTS

| | | | | |
|---|---|---|---|---|
| 5,157,915 A * | 10/1992 | Bart | B64D 27/18 | 244/54 |
| 5,338,236 A * | 8/1994 | Dunham | B63H 20/32 | 440/77 |
| 5,350,136 A * | 9/1994 | Prosser | B64D 29/08 | 244/118.2 |
| 5,372,338 A * | 12/1994 | Carlin | B64D 29/08 | 244/129.4 |
| 5,518,206 A * | 5/1996 | Arnold | B64D 29/06 | 244/129.4 |
| 5,863,014 A | 1/1999 | Standish | | |
| 5,941,061 A * | 8/1999 | Sherry | B64D 29/08 | 244/54 |
| 6,179,249 B1 * | 1/2001 | Canadas | 244/53 R | |
| 6,227,485 B1 * | 5/2001 | Porte | 244/54 | |
| 6,340,135 B1 * | 1/2002 | Barton | B64D 29/00 | 244/53 B |
| 6,434,927 B1 * | 8/2002 | Stretton | F02K 1/72 | 239/265.31 |
| 6,666,408 B1 * | 12/2003 | De Carvalho | B64D 29/00 | 244/129.4 |
| 6,966,524 B2 | 11/2005 | Stuhr | | |
| 6,991,500 B1 * | 1/2006 | Gulko | F02B 61/045 | 123/195 P |
| 7,090,165 B2 * | 8/2006 | Jones et al. | 244/53 R | |
| 7,255,307 B2 * | 8/2007 | Mayes | 244/129.5 | |
| 7,484,356 B1 * | 2/2009 | Lair | 60/226.2 | |
| 8,528,857 B2 * | 9/2013 | Hillereau et al. | 244/110 B | |
| 8,727,275 B2 * | 5/2014 | Aten et al. | 244/110 B | |
| 8,740,137 B2 * | 6/2014 | Vauchel et al. | 244/54 | |
| 2002/0178711 A1 * | 12/2002 | Martens | F02K 1/386 | 60/226.1 |
| 2006/0038065 A1 * | 2/2006 | Howe | B64D 29/00 | 244/54 |
| 2008/0073461 A1 * | 3/2008 | Guibert | B64D 27/26 | 244/54 |
| 2008/0315034 A1 * | 12/2008 | Vauchel et al. | 244/54 | |
| 2009/0189013 A1 * | 7/2009 | Hammer | B64D 29/04 | 244/54 |
| 2010/0001123 A1 * | 1/2010 | Hillereau et al. | 244/54 | |
| 2010/0031628 A1 * | 2/2010 | Oba | B64D 29/06 | 60/226.1 |
| 2010/0040466 A1 * | 2/2010 | Vauchel et al. | 415/213.1 | |
| 2010/0050651 A1 * | 3/2010 | Dindar | B64D 33/04 | 60/770 |
| 2010/0064659 A1 * | 3/2010 | Wang | 60/226.2 | |
| 2010/0084507 A1 * | 4/2010 | Vauchel et al. | 244/1 N | |
| 2010/0107599 A1 * | 5/2010 | Vauchel | 60/226.2 | |
| 2010/0132332 A1 | 6/2010 | Vauchel | | |
| 2010/0148012 A1 * | 6/2010 | McDonough et al. | 244/53 B | |
| 2010/0201190 A1 * | 8/2010 | Pereira | 307/9.1 | |
| 2010/0206981 A1 * | 8/2010 | Baillard | B64D 27/26 | 244/54 |
| 2010/0252689 A1 * | 10/2010 | Vauchel et al. | 244/53 B | |
| 2010/0284806 A1 * | 11/2010 | Vauchel et al. | 415/214.1 | |
| 2010/0287910 A1 * | 11/2010 | Joret et al. | 60/226.2 | |
| 2010/0327110 A1 * | 12/2010 | Caruel et al. | 244/54 | |
| 2011/0167790 A1 * | 7/2011 | Cloft | F02K 1/68 | 60/226.2 |
| 2011/0192134 A1 * | 8/2011 | Vauchel et al. | 60/226.1 | |
| 2011/0219783 A1 * | 9/2011 | Joret et al. | 60/796 | |
| 2011/0250054 A1 * | 10/2011 | Pereira | 415/126 | |
| 2011/0284686 A1 * | 11/2011 | Caruel | B64D 27/26 | 244/54 |
| 2013/0052005 A1 * | 2/2013 | Cloft | B64D 27/26 | 415/213.1 |
| 2013/0118599 A1 * | 5/2013 | James | B64D 29/00 | 137/15.1 |
| 2013/0259641 A1 * | 10/2013 | Stewart | F01D 25/24 | 415/1 |
| 2014/0030087 A1 * | 1/2014 | Soria | F02K 1/72 | 415/213.1 |
| 2014/0150403 A1 * | 6/2014 | Stuart | F02K 1/72 | 60/204 |
| 2014/0150404 A1 * | 6/2014 | Gallet | F02K 1/72 | 60/226.2 |
| 2014/0234090 A1 * | 8/2014 | Hurlin | B64D 29/06 | 415/182.1 |
| 2015/0125270 A1 * | 5/2015 | Suciu | F01D 25/28 | 415/126 |
| 2015/0266587 A1 * | 9/2015 | Pretty | B64D 29/06 | 415/214.1 |
| 2015/0308382 A1 * | 10/2015 | Aten | F02K 1/566 | 60/226.2 |
| 2016/0053719 A1 * | 2/2016 | Pretty | B64D 29/00 | 239/265.19 |
| 2016/0138623 A1 * | 5/2016 | Le Coq | B64D 29/06 | 239/265.11 |
| 2016/0347465 A1 * | 12/2016 | Mellor | B64D 29/06 | |
| 2016/0348650 A1 * | 12/2016 | Moeller | F03D 80/82 | |

* cited by examiner

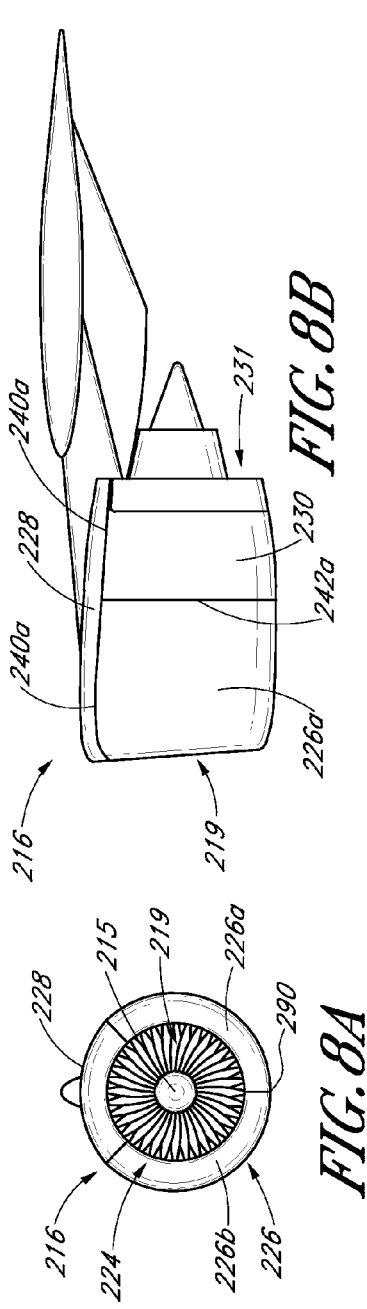
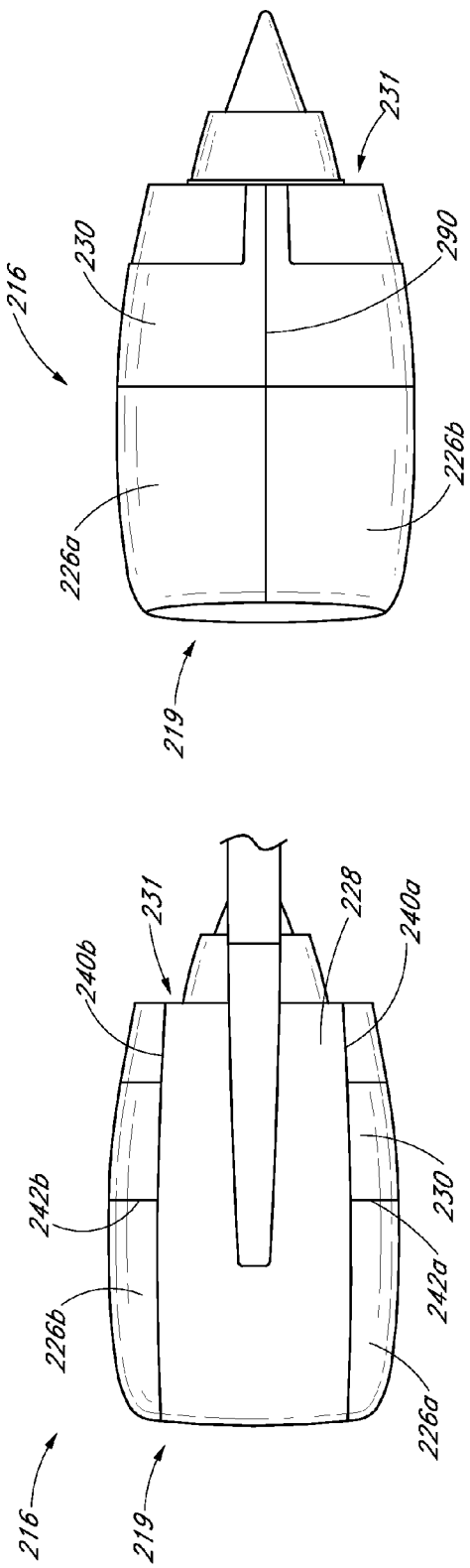

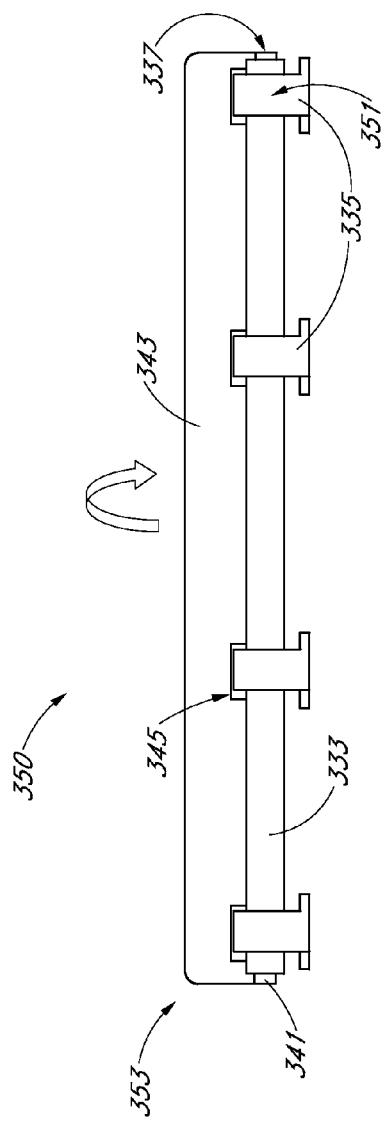
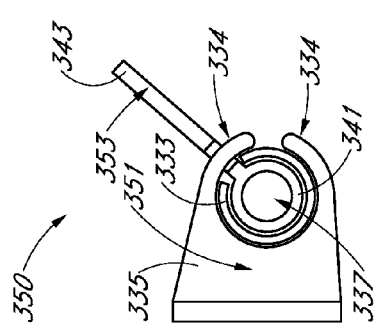
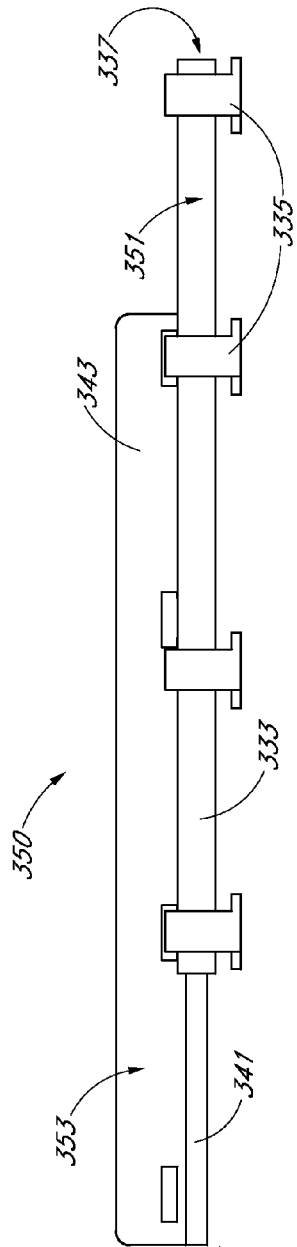
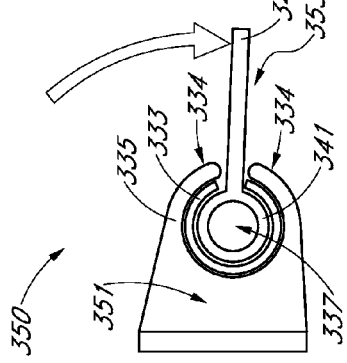

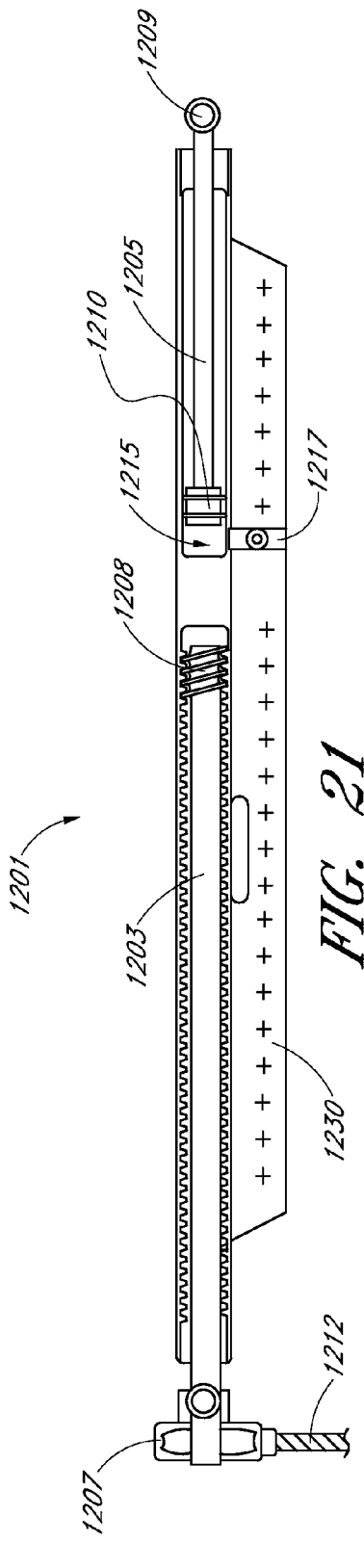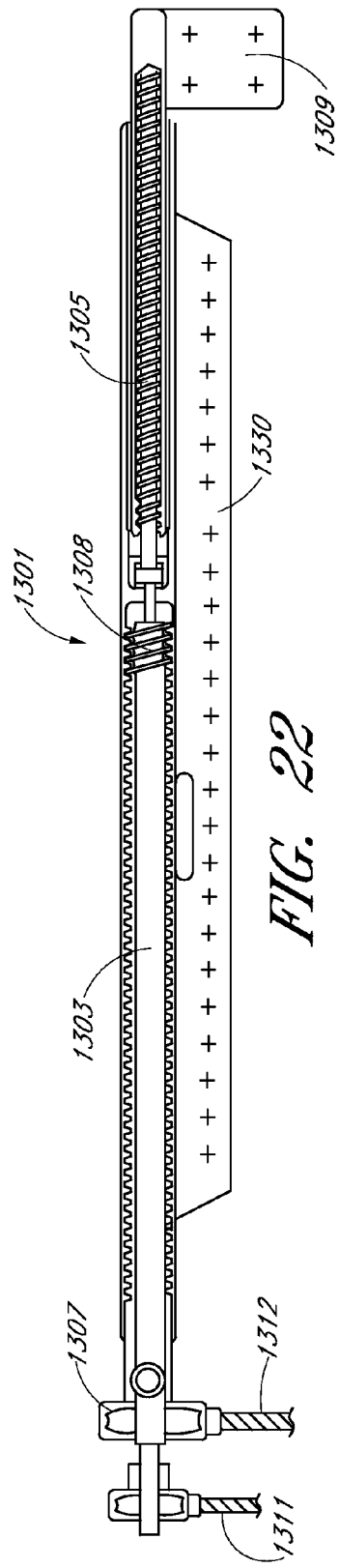
FIG. 21
FIG. 22

NACELLE WITH LONGITUDINAL TRANSLATING COWLING AND ROTATABLE SLEEVES

BACKGROUND

Field

This application relates generally to engine nacelles.

Description of the Related Technology

A nacelle is a casing or housing that holds an engine and/or other equipment on an aircraft. Nacelles are often coupled to an underside of a wing, for example, by a pylon. At present, nacelles are typically made from several pieces or cowlings which meet one another at lines, seams, or junctures referred to as splits. Such cowlings typically must be removed or moved to provide access to the engine or other components housed within the nacelle. Further, nacelle splits introduce perturbations to air passing over the nacelle and such perturbations can increase drag forces on another surface of the aircraft, e.g., a wing disposed above the nacelle. Additionally, such cowlings typically comprise sleeves that must be rotated about one or more hinge centers to provide access to the inside of the nacelle. Thus, providing a nacelle that minimizes drag forces on the aircraft and that allows for easy access to the inside of the nacelle is both a goal and a significant challenge in aeronautical engineering applications.

SUMMARY

The devices, systems, and methods of the present invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "DETAILED DESCRIPTION OF THE PREFERRED EMBODIMENTS" one of ordinary skill in the art will appreciate how the features of this invention provide advantages as compared to existing nacelles.

One aspect of the present invention is a nacelle that has an inlet, an outlet, and a longitudinal axis extending therebetween. The nacelle includes a first cowling extending between the inlet and the outlet and circumscribing at least a portion of the nacelle about the longitudinal axis and a second cowling defining a portion of the inlet and being configured to longitudinally translate relative to the first cowling.

Another aspect is a nacelle that has an inlet, an outlet, and a longitudinal axis extending therebetween. The nacelle includes a first cowling at least partially defining the inlet and at least partially defining the outlet, a second cowling at least partially defining the inlet, the second cowling being configured to longitudinally translate relative to the first cowling, and a third cowling at least partially defining the outlet.

Another aspect is a nacelle having an inlet, an outlet, and a longitudinal axis extending therebetween. The nacelle includes a first cowling at least partially defining the inlet and at least partially defining the outlet and a second cowling slidingly coupled to and supported by the first cowling so as to move between at least a first longitudinal position and a second longitudinal position, the second cowling defining at least a portion of the inlet when in the first position.

Further aspects, features and advantages of the present invention will become apparent from the detailed description that follows.

BRIEF DESCRIPTION OF THE DRAWINGS

These and other features, aspects, and advantages of the present invention will now be described in connection with embodiments of the present invention, in reference to the accompanying drawings. The illustrated embodiments, however, are merely examples and are not intended to limit the invention. The various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus, device, system, method, or any other illustrated component or process.

FIG. 8A is a front view of a nacelle according to another embodiment.

FIG. 8B is a side view of the nacelle of FIG. 8A relative to a wing.

FIG. 8C is a top view of the nacelle of FIG. 8A.

FIG. 8D is a bottom view of the nacelle of FIG. 8A.

FIGS. 12A-12D illustrate an embodiment of an engaging structure for use with a nacelle.

FIGS. 20-22 are side views of embodiments of actuator devices for use with nacelles.

DETAILED DESCRIPTION OF THE PREFERRED EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Some embodiments of the invention disclosed herein relate to nacelles that incorporate top cowlings formed without splits, seams, or junctions between the inlet side and outlet side of the nacelle. Such cowlings can reduce air flow perturbations over the nacelle that can result in drag forces on the underside of an associated wing. Additionally, such top cowlings can be slidingly coupled to one or more engaging structures disposed on opposite lateral sides of the nacelle. The engaging structures extend along at least a portion of the longitudinal length of the nacelle. In this way, other components of the nacelle may translate relative to the top cowling via the engaging structures. For example, a nacelle can include a C-shaped inlet cowling that defines an inlet lip in combination with the top cowling. The inlet cowling can be coupled to an engaging structure to translate longitudinally relative to the top cowling. Such a configuration may facilitate access to internal engine components without requiring the burdensome rotation and lifting of heavy and sizable nacelle components relative to the top cowling. Other structures that may translate relative to the top cowling along the engaging structures include the outlet cowling, thrust reverser cascade, and/or variable area fan nozzle.

In some embodiments, the engaging structures extend along a substantial longitudinal length of the nacelle. In some embodiments, the engaging structures include a track coupled to the top cowling and a slider coupled to another component of the nacelle. Of course, other configurations of engaging structures can be implemented to provide for the longitudinal translation and/or rotation of one or more nacelle components relative to the top cowling. Thus, the top cowling may support such translating components even when they are extended beyond the inlet and/or outlet side of the top cowling. Hence, the nacelles disclosed herein can provide several advantages over existing nacelles.

Figure 1:
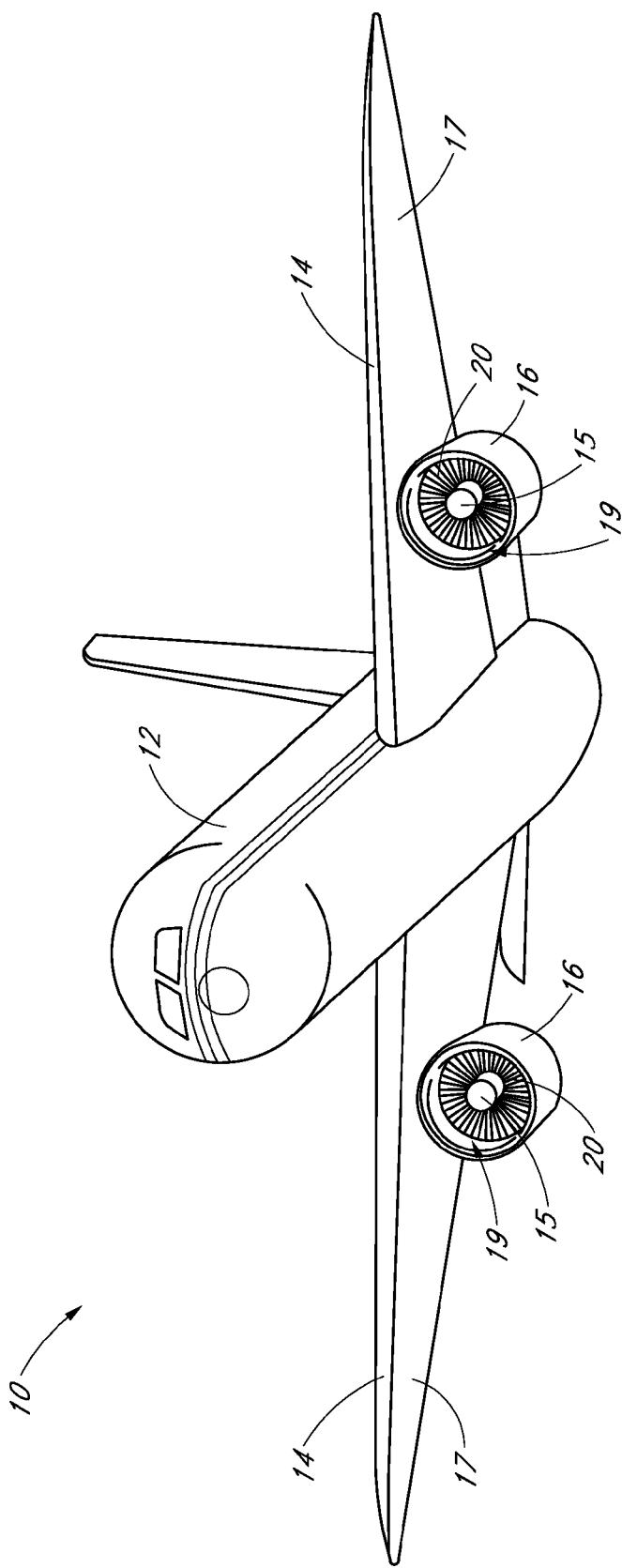
FIG. 1 is a perspective view of an aircraft incorporating a nacelle.

FIG. 1 is a perspective view of an aircraft 10 having a fuselage 12 and a pair of wings 14 extending laterally from the fuselage 12. A nacelle 16 is coupled to an underside of each wing 14. Although not illustrated in FIG. 1, in some embodiments, each nacelle 16 is coupled to a wing by a pylon, or any other suitable structure capable of coupling a load to a wing.

Each nacelle 16 houses an aircraft engine 15, for example, a high bypass ratio engine, which receives air through a fan 20 disposed near an inlet 19 of the nacelle 16, combusts the received air with fuel within a combustion chamber, and provides an exhaust jet through a rear-facing nozzle to propel the aircraft 10 in a forward direction. Additionally, high bypass ratio engines also receive a substantial amount of air through the inlet 19 of the nacelle 16 that is passed over or bypasses the engine 15 to provide additional thrust. The bypass air is combined with the exhaust jet and improves fuel efficiency and engine noise. In some embodiments, the nacelle 16 can include a variable area fan nozzle (VAFN) cowling configured to vary an outlet area through which the exhaust jet and bypass air passes through. Such a VAFN cowling can be an integral part of an outlet cowling or sleeve or a distinctly separate and translatable cowling component.

Still referring to FIG. 1, during flight, air flows through the inlet 19 of each nacelle 16 as well as over the outer surfaces of each nacelle 16. The outer surfaces of the nacelle 16 may be formed by various cowlings that are joined together to form the nacelle 16. Surface irregularities on the outside of each cowling component can disrupt air flowing over the nacelle and lead to downstream drag as these disruptions may interact with other surfaces of the aircraft 10. For example, air flowing over a nacelle 16 may be disturbed by an external split or juncture between two or more cowlings or components of the nacelle 16. The resulting disruption may increase drag on the underside 17 of an associated wing 14. Air flow disruptions may be particularly problematic when the nacelle 16 is disposed relatively near to the underside 17 of the wing 16 (e.g., in high bypass ratio engine aircrafts).

To assist in the description of the nacelles described below with reference to the figures, the following coordinate terms are used, consistent with the coordinate axes illustrated. A "longitudinal axis" is generally parallel to an axis of the nacelle that extends between the inlet and outlet of the nacelle. A "lateral axis" is normal to the longitudinal axis and is generally parallel to a wing associated with the nacelle. A "transverse axis" extends normal to both the longitudinal and lateral axes. In addition, as used herein, "the longitudinal direction" refers to a direction substantially parallel to the longitudinal axis; "the lateral direction" refers to a direction substantially parallel to the lateral axis; and "the transverse direction" refers to a direction substantially parallel to the transverse axis. The terms "upper," "lower," "top," "bottom," "underside," "upperside" and the like, which may be used to describe nacelles and related components in the discussion below, are used in reference to the illustrated orientation of embodiments. For example, the term "upperside" is used to describe the portion of a nacelle that is disposed above an engine housed within the nacelle. The term "underside" is used to describe the portion of the nacelle that is located below the plane that passes through the longitudinal axis of the nacelle.

Figure 2:
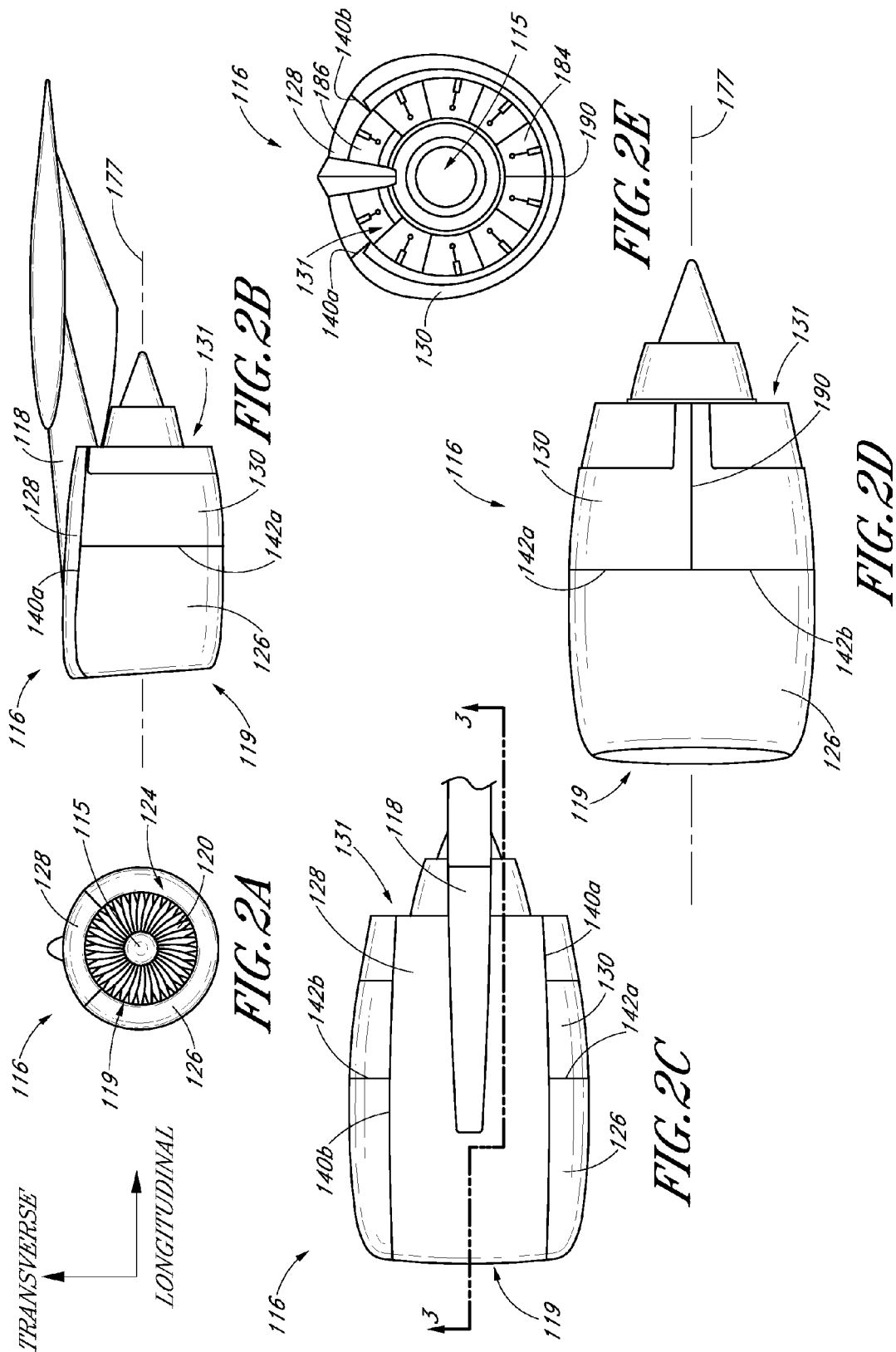
FIG. 2A is a front view of a nacelle according to a preferred embodiment of the present invention.
FIG. 2B is a side view of the nacelle of FIG. 2A relative to a wing.
FIG. 2C is a top view of the nacelle of FIG. 2A.
FIG. 2D is a bottom view of the nacelle of FIG. 2A.
FIG. 2E is a rear view of the nacelle of FIG. 2A.

FIGS. 2A-7B illustrate an embodiment of a nacelle 116. FIG. 2A schematically depicts a front view of the nacelle 116 and an engine 115 housed therein. The engine 115 is coupled with a fan 120 that is disposed near the front side of the nacelle 116 to draw air into the nacelle through an inlet 119. As described in further detail below, the air drawn in through the inlet 119 may be expelled through the outlet 131 of the nacelle 116 and/or combusted with fuel to provide a forward thrust for an associated aircraft. Additionally, air can be expelled through a thrust reverser arrangement to produce a backwards (e.g., reverse) thrust. The nacelle 116 is coupled to an aircraft by a pylon 118. For example, the nacelle 116 can be coupled to the underside of an aircraft wing such that the engine 115 provides forward and reverse thrust capabilities to the aircraft.

With reference to FIGS. 2A-2E, the nacelle 116 has an inlet lip or noselip 124 formed by an inlet cowling 126 and a top cowling 128. As illustrated, the inlet lip 124 can be substantially ring-shaped to define the inlet 119 of the nacelle. In some embodiments, the inlet cowling 126 defines a C-shaped portion and the top cowling 128 defines an arcuate portion. In this way, the inlet cowling 126 and the top cowling 128 together form a channel through which air flows. The channel extends along a centerline 177 parallel to the longitudinal axis of the nacelle 116 as shown in FIGS. 2B and 2D. In some embodiments, the top cowling 128 spans between 10° and 180° of the circumference of the nacelle 116, or more, and the inlet cowling 126 spans the remaining portion of the nacelle 116 so as to form the channel. For example, the top cowling 128 can span 10°, 20°, 30°, 40°, 50°, 60°, 70°, 80°, 90°, 100°, 110°, 120°, 130°, 140°, 150°, 160°, 170°, or 180° of the circumference of the nacelle 116. In some embodiments, the top cowling 128 spans between about 20° and about 90° of the nacelle 116 and the inlet cowling 126 spans the remaining portion of the nacelle 116.

FIGS. 2B and 2C illustrate a side view and a top view, respectively, of the nacelle 116. As can be seen in these figures, the nacelle 116 includes an outlet cowling 130 disposed adjacent to the inlet cowling 126. Transverse splits 142a, 142b are disposed between the inlet cowling 126 and the outlet cowling 130. Additionally, the nacelle 116 includes a pair of longitudinally extending splits 140a, 140b disposed between the top cowling 128 and the inlet and outlet cowlings 126, 130. In other words, the longitudinally extending splits 140a, 140b extend from the inlet 119 to the outlet 131. As discussed above, such splits 140a, 140b, 142a, 142b can introduce perturbations to air flowing over the nacelle 116. However, as shown in FIGS. 2B and 2C, the top cowling 128 does not include a transverse-extending split or juncture between the inlet 119 and the outlet 131 of the nacelle 116. For example, the top cowling 128 can include a unitary or homogeneous portion that extends continuously in the longitudinal direction from the inlet 119 to the outlet 131 of the nacelle 116. Thus, a flow of air passing over the outer surface of the top cowling 128 of the nacelle 116 is less likely to form perturbations and/or disturbances stemming from splits in the top cowling 128. In this way, the "splitless" top cowling 128 improves a downstream flow of air that may contact or impinge another component of an associated aircraft, e.g., the underside of a wing. Therefore, the lack of splits in the top cowling 128 can advantageously reduce drag on, and improve fuel efficiency of, the associated aircraft.

As shown in FIGS. 2D and 2E, in some embodiments the nacelle 116 includes a longitudinally extending split 190 extending from the aft side of the inlet cowling 126 to the outlet 131 along the bottom side of the nacelle 116. In this way, the outlet cowling 130 can include complementary halves or sleeves that are rotatable about the centerline 177 of the nacelle 116 to provide access to internal components within the nacelle 116.

In some embodiments, the nacelle 116 can include a VAFN cowling configured to adjust a size of the outlet 131 of the nacelle. In such embodiments, it can be desirable to limit the span of the variable area fan nozzle such that it does not overlap with the span of the top cowling 128 to avoid an interface or split therebetween.

As shown in FIGS. 2B and 2C, the top cowling 128 can be structurally integrated with the pylon 118 such that the inlet and/or outlet cowlings 126, 130 can translate or otherwise move relative to the top cowling 128 and pylon 118. In some embodiments, the top cowling 128 and the pylon 118 are integrally formed such that there are no splits formed therebetween. For example, the top cowling 128 and the pylon 118 may be formed from a single homogeneous piece of material. In other embodiments, the top cowling 128 and the pylon may be separate structures that are permanently affixed to one another. For example, the top cowling 128 and the pylon 118 may be inseparable without damaging, or significantly modifying, at least one of the top cowling 128 and the pylon 118. In such embodiments, one or more fairings or other aerodynamic structures may be incorporated between the top cowling 128 and the pylon 118 to improve the aerodynamic characteristics of the combined structure.

As shown in FIG. 2E, the nacelle 116 can include blocker doors 184 that are activated to impede (e.g., to prevent, inhibit, or reduce) the flow of bypass air and prevents such air from passing through the outlet 131 of the nacelle 116 when the nacelle 116 is in a reverse thrust configuration. The nacelle 116 can also includes upper blocker doors 186 that are independently controllable from the other blocker doors 184 to allow for more or less air flow to pass through outlet 131 of the nacelle near the top cowling 128 in order to balance duct pressures within the nacelle. In other embodiments all of the blocker doors are controlled in a unified manner.

Figure 3:
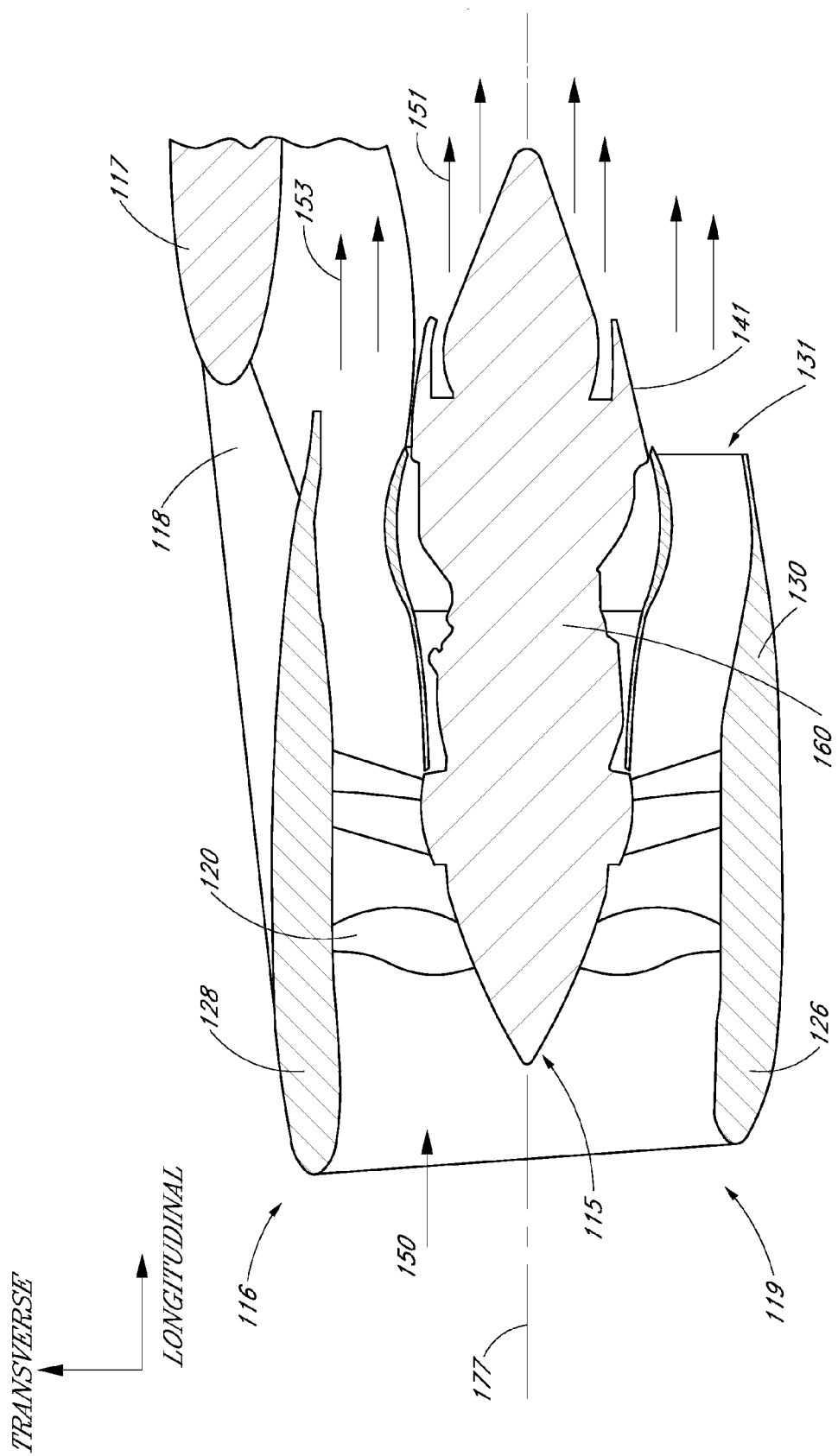
FIG. 3 is a cross-sectional view through the nacelle of FIG. 2C taken along line 3-3.

FIG. 3 shows a cross-sectional view of the nacelle 116 and engine 115 taken along line 3-3 of FIG. 2C. As shown, the engine 115 extends along a centerline 177 disposed parallel to the longitudinal axis of the nacelle 116. The engine 115 includes an exhaust nozzle 141 that extends through the outlet 131 of the nacelle 116.

As schematically illustrated in FIG. 3, the fan 120 acts to draw incoming air 150 into the nacelle 116 through the inlet 119. A portion of the incoming air 150 enters the engine 115 while another portion 153 of the drawn in air 150 bypasses the engine 115 and passes over the engine cowling 160. Thus, bypass air 153 may exit the outlet 131 along with a flow of engine exhaust 151 to provide a forward thrust relative to the nacelle 116 (e.g., to provide a force that thrusts the nacelle and aircraft from right to left as illustrated in FIG. 3).

Figure 4:
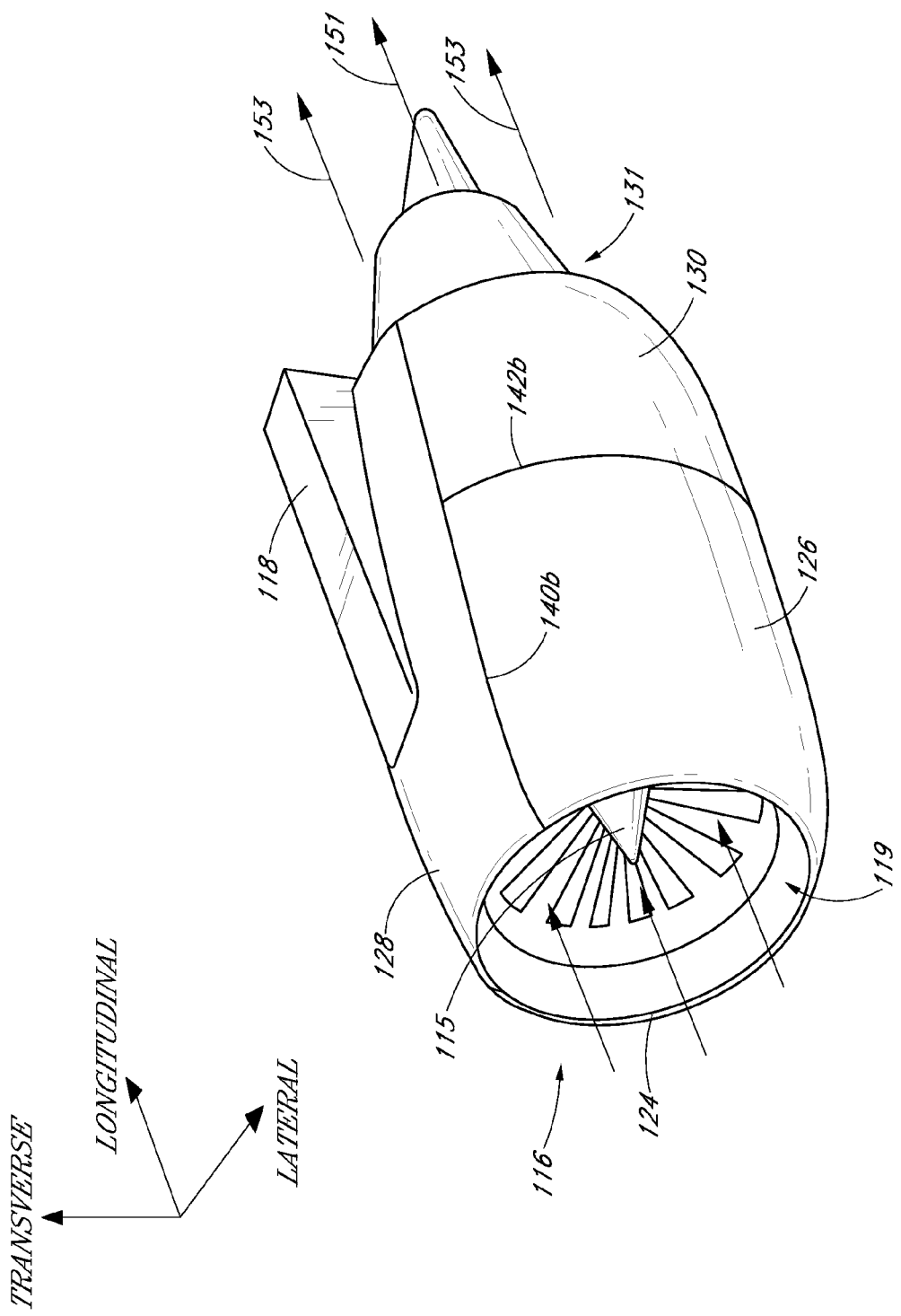
FIG. 4 is a perspective view of the nacelle of FIGS. 2A-2E in a forward thrust configuration.

FIG. 4 is a perspective view of the nacelle 116 and engine 115 of FIGS. 2A-2E in a forward thrust configuration. As shown in FIG. 4, when in the forward thrust configuration, the outlet 131 of the nacelle 116 is substantially unimpeded by blocker doors such that the engine exhaust 151 and bypass air 153 exit the nacelle 116 through an air pathway or duct defined between the inlet 119 and outlet 131 of the nacelle.

Figure 5:
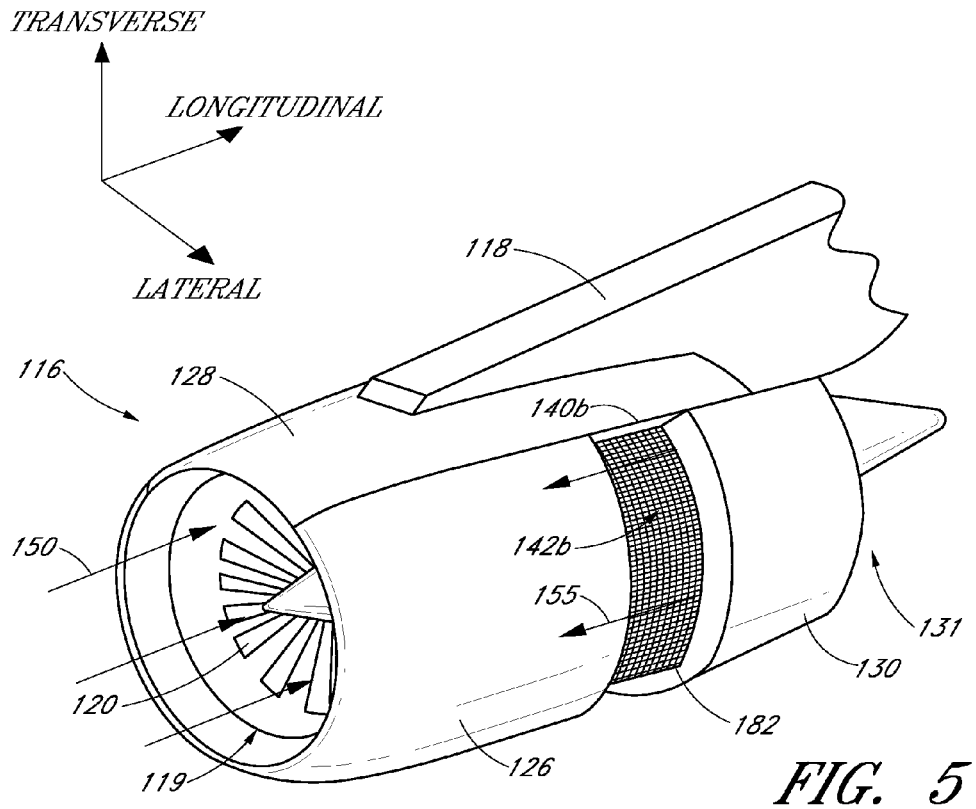
FIG. 5 is a perspective view of the nacelle of FIGS. 2A-2E in a reverse thrust configuration.
Figure 6:
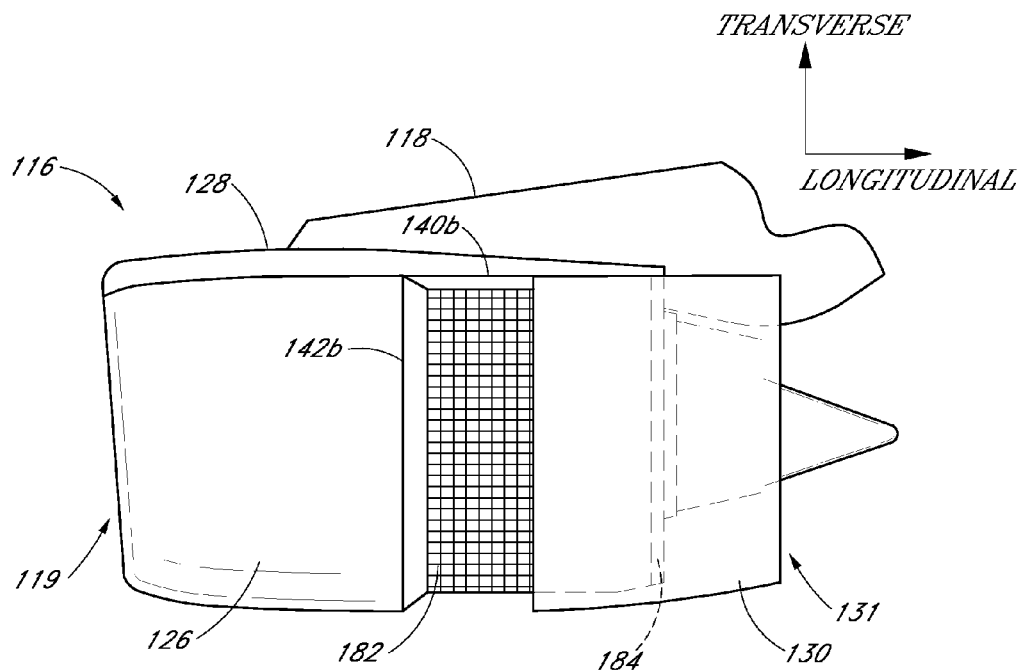
FIG. 6 is a side view of the nacelle of FIG. 5.

FIGS. 5 and 6 show the nacelle 116 of FIGS. 2A-2E in a reverse thrust configuration. In the reverse thrust configuration, the outlet cowling 130 is translated longitudinally away from the inlet cowling 126 as compared with the position of the outlet cowling illustrated in FIG. 4 (e.g., as compared with the position of the outlet cowling in the forward thrust configuration). In some embodiments, the longitudinal translation of the outlet cowling 130 is guided along the longitudinal splits 140b between the outlet cowling 130 and the top cowling 128 by one or more engaging structures. Such longitudinal translation of the outlet cowling 130 acts to expand the transverse splits 142a, 142b disposed between the inlet cowling 126 and the outlet cowling 130 and exposes an underlying cascade 182. The cascade 182 can include a plurality of vanes disposed circumferentially about the longitudinal axis of the nacelle 116. The vanes redirect a flow of air 155 from within the nacelle 116 through a lattice to produce a reverse thrust.

In some embodiments, the cascade 182 is disposed between the outlet cowling 130 and the longitudinal axis of the nacelle 116. That is to say, the cascade 182 can be disposed radially inward of the outlet cowling 130, but it does not extend in the circumferential direction beneath the top cowling 128 (i.e., it is not radially inward of the top cowling). In other embodiments, the cascade 182 is disposed between the outlet cowling 130 and the longitudinal axis of the nacelle and is also at least partially disposed between the top cowling 128 and the longitudinal axis of the nacelle. In such embodiments, a reverse thrust will not pass through the portion of the cascade 182 disposed radially inward of the top cowling 128. A portion of the cascade 182 may be disposed radially inward of the top cowling for load path or structural integrity purposes. Further, in such embodiments, the portion of the cascade 182 disposed radially inward of the top cowling may not redirect exit flow but can carry hoop loads directly to an associated pylon.

Figure 7A:
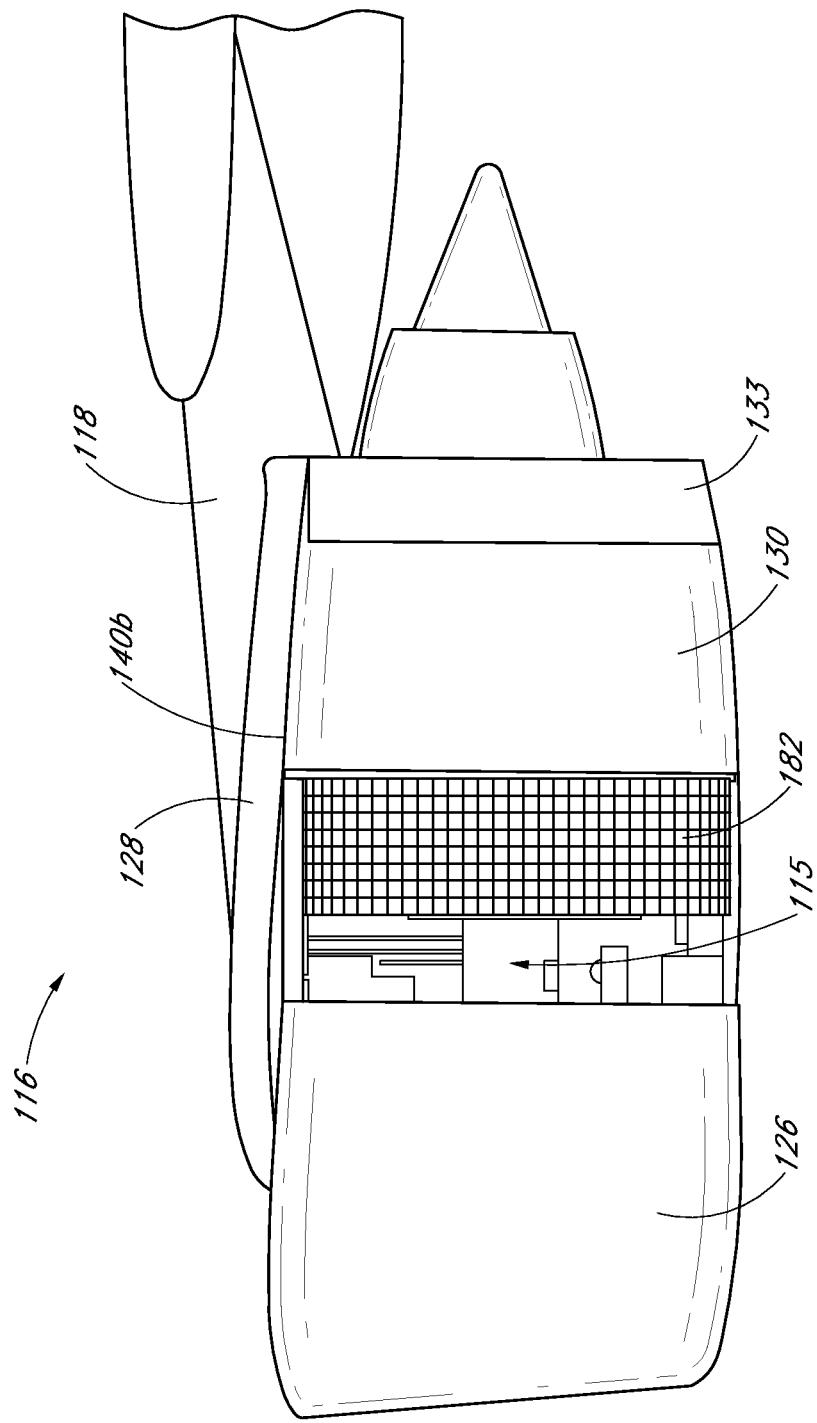
FIG. 7A is a side view of the nacelle of FIGS. 2A-2E showing the inlet cowling translated longitudinally relative to the top cowling.
Figure 7B:
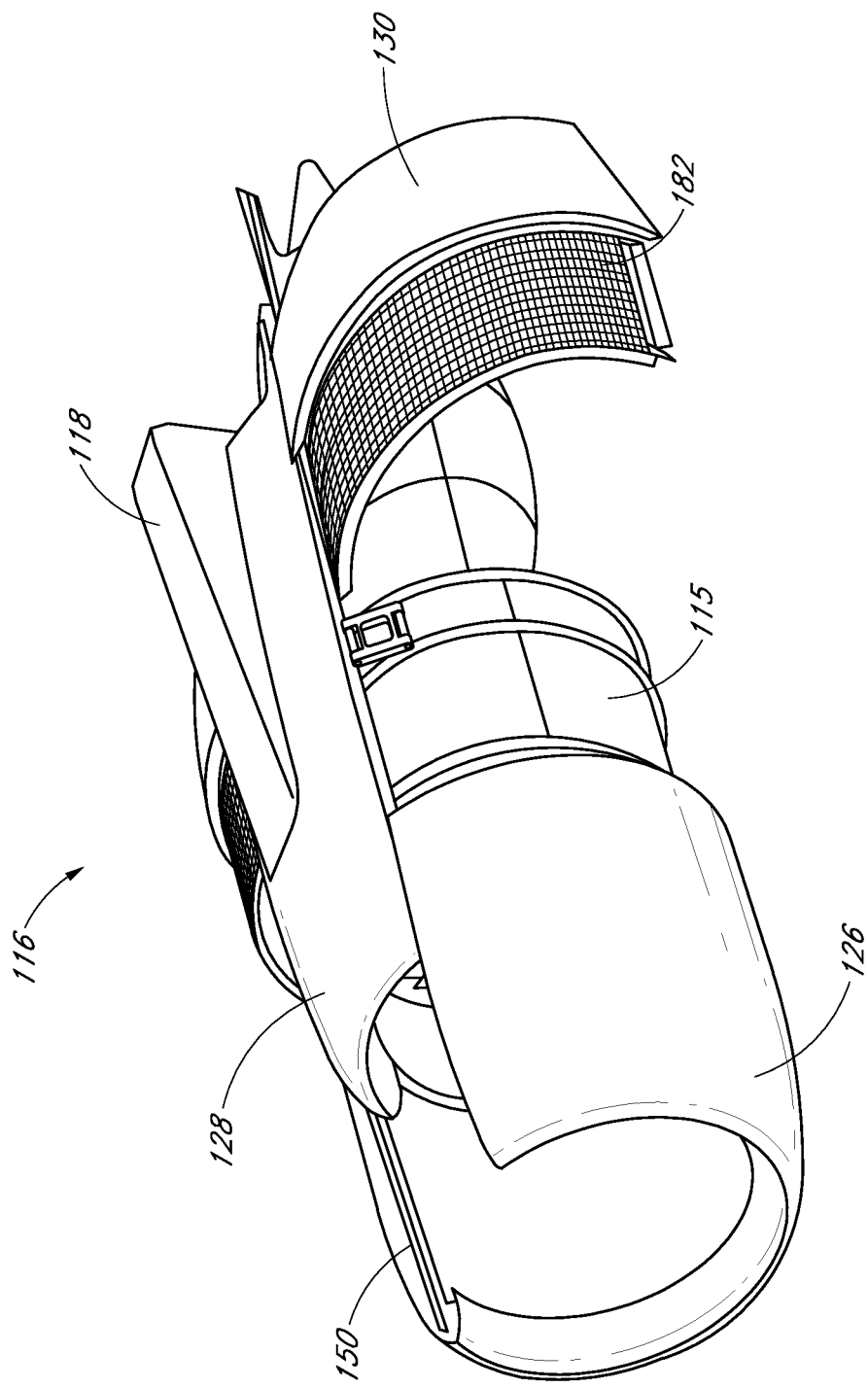
FIG. 7B is a perspective view of the nacelle of FIGS. 2A-2E showing the inlet cowling translated longitudinally relative to the top cowling and the outlet cowling sleeves translated and rotated relative to the top cowling.

Turning now to FIGS. 7A and 7B, the nacelle 116 is shown with the inlet cowling 126 translated longitudinally away from the outlet cowling 130. The top cowling 128 can include one or more engaging structures 150 for guiding the longitudinal translation of the inlet cowling 126, outlet cowling 130, cascade 182, and/or VAFN 133 relative to the top cowling 128. In this way, the inlet cowling 126, outlet cowling 130, cascade 182, and/or VAFN 133 can be translated relative to the top cowling 128 to provide access to portions or components of the engine 115 disposed within the nacelle 116. In some embodiments, the nacelle 116 can include a fence or strake along the terminating ends of the VAFN 133 to reduce vortex disturbances created when the VAFN 133 is translated aft. In this way, the fence or strake can limit aero-drag and acoustic penalties when the VAFN 133 is translated aft and such a configuration can facilitate the accommodation of the one or more engaging structures 150.

In some embodiments, the engaging structure 150 includes a first component (e.g., a track) coupled to the top cowling 128 and a second component (e.g., a slider) coupled to the inlet cowling 126 (shown in FIG. 7B). The first and second components of the engaging structure 150 are slidably engaged to provide for the translation of the inlet cowling 126 relative to the top cowling 128. Of course, in some embodiments, the first component may be coupled with the inlet cowling 126 and the second component may be coupled with the top cowling 128. Additionally, each engaging structure 150 can be similarly configured to any other engaging structures of the nacelle (e.g., the outlet cowling 130, cascade 182, and/or VAFN 133), or it may be differently configured. The sliding configuration of the inlet cowling 126 can be especially advantageous for servicing engine components that are located under the inlet cowling 126 and near the cascade 182 because the inlet cowling 126, outlet cowling 130, cascade 182, and/or VAFN 133 need not be completely removed or opened to provide adequate service access.

In addition to providing for translation between the top cowling 128 and the inlet cowling 126, the engaging structures 150 can provide for optional rotation of the inlet cowling 126 relative to the top cowling 128, if the inlet cowling 126 includes complementary halves or portions separated by a split as discussed below with respect to FIGS. 8A-8D. This rotation can be about a hinge center that is coaxial with the engaging structure. As shown in FIG. 7B, the outlet cowling 130 and/or cascade 182 can comprise halves or sleeves that are independently rotatable relative to the top cowling 128. Accordingly, the outlet cowling 130 and cascade 182 can translate independently relative to the top cowling 128 to provide access to portions of the engine 115 and the sleeves of these structures can rotate relative to the top cowling 128 to provide greater access for servicing or inspecting the engine 115.

Turning now to FIGS. 8A-8D, another embodiment of a nacelle 216 is illustrated. FIG. 8A schematically depicts a front view of the nacelle 216 and an engine 215 housed therein. The nacelle 216 includes an inlet lip 224 which defines an inlet 219. Similar to the inlet lip of FIGS. 2A-7B, the inlet lip 224 is formed by an inlet cowling 226 and a top cowling 228. The inlet cowling 226 defines a C-shaped portion of the inlet lip 224 and the remainder of the inlet lip is defined by the top cowling 228. In contrast to the inlet cowling 126 of FIGS. 2A-7B, the inlet cowling 226 includes sleeves 226a, 226b. The sleeves 226a, 226b are separated from one another along a longitudinally extending split 290. As discussed in further detail below, the sleeves 226a, 226b can be translated independently relative to the top cowling 228 and/or rotated independently relative to the top cowling 228 to provide access to portions of the engine 215. As discussed in more detail below, the sleeves 226a, 226b can also translate and/or rotate independent of the outer cowling 230. Further, in some embodiments, the sleeves 226a, 226b can be translated together to provide for simple access to engine fan case accessories.

FIGS. 8B and 8C illustrate a side view and a top view, respectively, of the nacelle 216. As can be seen in these figures, transverse splits 242a, 242b are disposed between the inlet cowling 226 and the outlet cowling 230. Additionally, the nacelle 216 includes a pair of longitudinally extending splits 240a, 240b disposed between the top cowling 228 and the inlet and outlet cowlings 226, 230. As discussed above, such splits 240a, 240b, 242a, 242b can introduce perturbations into the air flow. However, as shown in FIGS. 8B and 8C, the top cowling 228 of the nacelle 216 does not include a transverse-extending split or juncture between the inlet 219 and the outlet 231. Although the nacelle 216 includes the longitudinally extending split 290, the location of the split 290 on the bottom of the bottom of the nacelle 216 does not impact the aerodynamic benefits provided by the splitless top cowling 228. Although this split 290 may introduce perturbations to a flow of air that passes over the underside of the nacelle 216, such perturbations are unlikely to increase drag forces on downstream surfaces of the aircraft because the split 290 is disposed on the underside of the nacelle 216 (e.g., away from an associated wing).

Figure 9A:
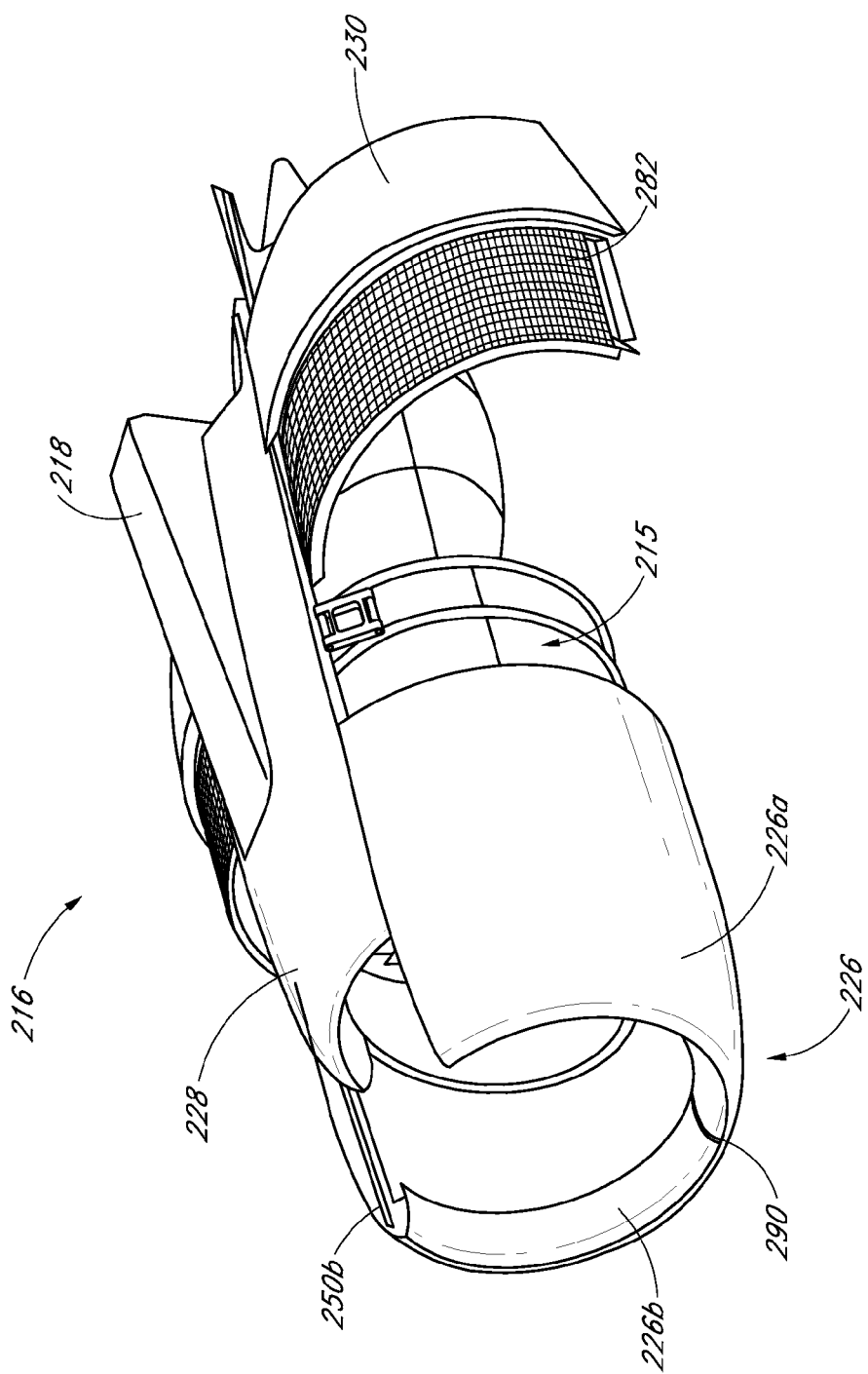
FIG. 9A is a perspective view of the nacelle of FIGS. 8A-8D showing the inlet cowling translated relative to the top cowling and the outlet cowling sleeves translated and rotated relative to the top cowling.
Figure 9B:
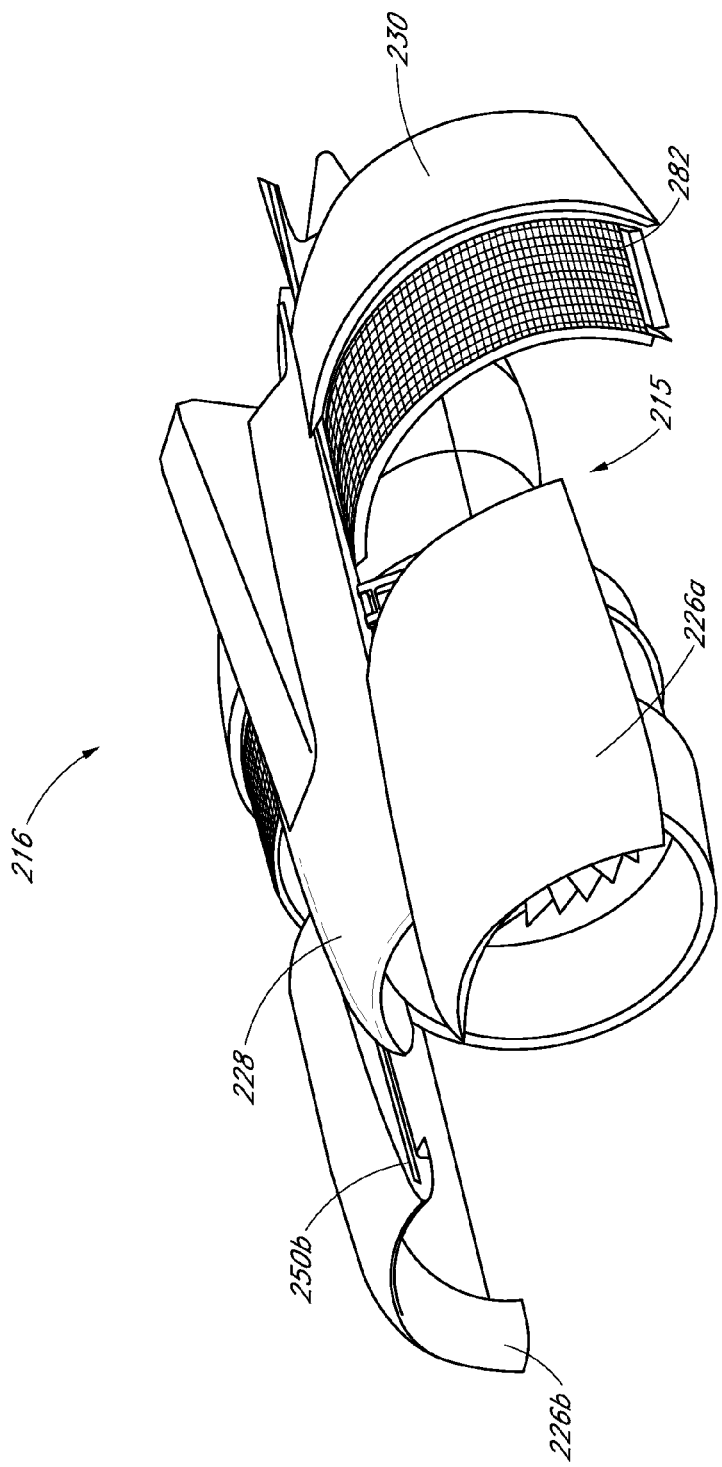
FIG. 9B is a perspective view of the nacelle of FIG. 9A showing the inlet cowling sleeves rotated relative to the top cowling.

FIGS. 9A and 9B are perspective views of the nacelle 216. Similar to the nacelle of FIGS. 2A-7B, the inlet cowling 226, outlet cowling 230, and/or cascade 282 can translate longitudinally relative to the top cowling 228 as shown. In some embodiments, the top cowling 228 includes at least one engaging structure 250b configured to guide the longitudinal translation of the inlet cowling 226, outlet cowling 230, and/or cascade 282. In this way, components of the nacelle 216 can be translated relative to the top cowling 228 to provide access to portions of the engine 215. Further, the at least one engaging structure 250b can support the translated components in an extended or cantilevered position relative to the top cowling 228. As a result, the engine 215 may be serviced and/or inspected by simply translating the inlet cowling 226, outlet cowling 230, and/or cascade 282. For example, the inlet cowling 226, outlet cowling 230, and/or cascade 282 may be translated along a short stroke for minor service access, e.g., oil fills/checks, releasing and unlatching of panels, access to electrical systems, and/or de-icing systems.

As shown in FIG. 9A, the sleeves 226a, 226b of the inlet cowling 226 may be releasably coupled together at the longitudinally extending split 290 such that the sleeves may be translated together or independently. Additionally, as shown in FIG. 9B, the sleeves 226a, 226b may be independently rotated relative to the top cowling 228 to provide for greater access to the engine 215. Thus, the translation and rotation of the sleeves of the inlet cowling 226, outlet cowling 230, and cascade 282 can provide access along the bottom side of the nacelle 216, for example, when removing or changing the engine 215. Without the translation and/or rotation of the sleeves of the inlet cowling 226, outlet cowling 230, and cascade 282, the engine would otherwise have to be maneuvered between inlet cowling and the pylon. Further, the replacement engine/inner barrel may even intrude into the inlet cowling somewhat, if the sleeves of the inlet cowling 226 are not hinged up for clearance.

Figure 10:
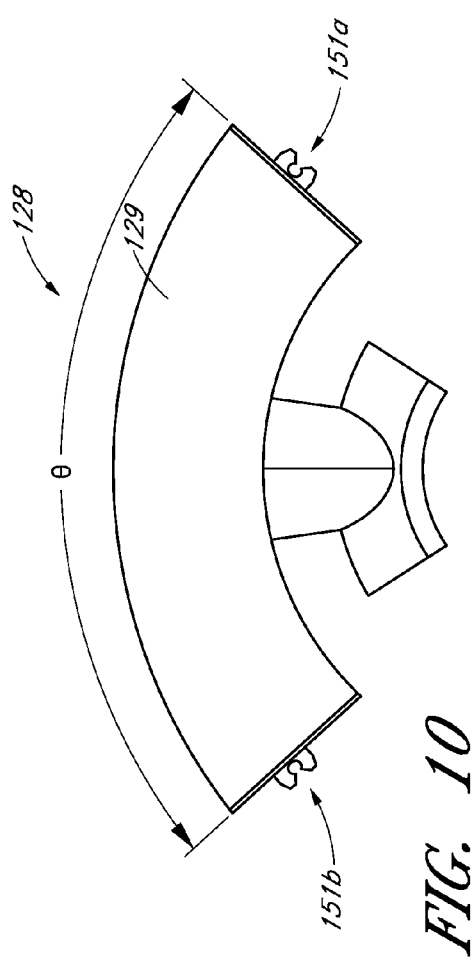
FIG. 10 is a front view of the top cowling and integrated pylon of the nacelle of FIGS. 2A-2E.
Figure 11:
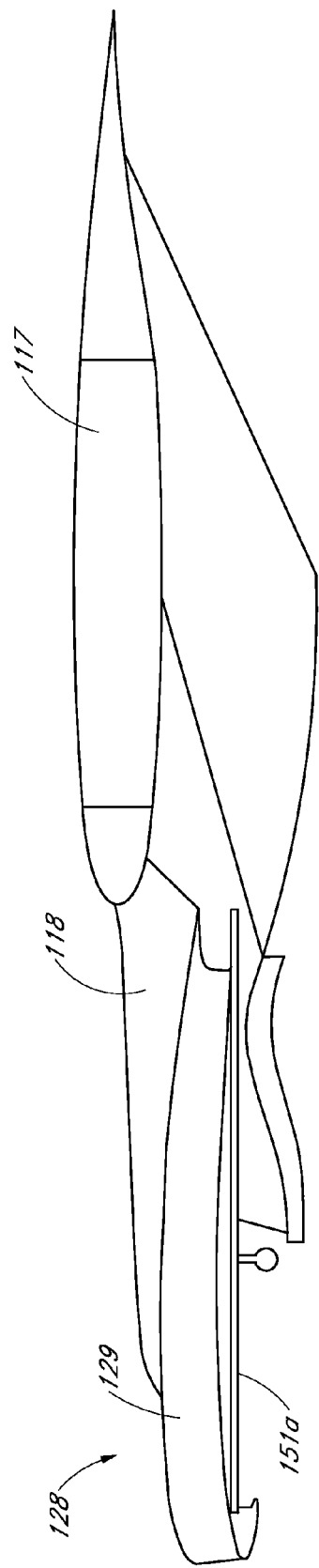
FIG. 11 is a side view of the top cowling and integrated pylon of the nacelle of FIGS. 2A-2E relative to a wing.

FIGS. 10 and 11 show the top cowling 128 and integrated pylon 118 of the nacelle 116 of FIGS. 2A-7B. As shown in the front view of FIG. 10, the top cowling 128 includes an apron portion 129 and a pair of engaging structure components 151a, 151b disposed on opposite lateral sides of the apron portion 129. As shown in FIG. 11, the apron portion 129 can extend longitudinally between the inlet and the outlet of the corresponding nacelle such that no transverse splits or junctures are formed in the top cowling 128 between the inlet and the outlet. Additionally, the engaging structure components 151a, 151b extend along the longitudinal length of the top cowling 128 to allow one or more components to translate relative to the top cowling 128. In this way, the top cowling 128 and pylon 118 can support the translatable components relative to the wing 117. In some embodiments, one or both of the engaging structure components 151a, 151b comprise a longitudinally extending track or channel.

As shown in FIG. 10, the apron portion 129 has an angular span θ about the longitudinal axis of the corresponding nacelle. For example, the angular span θ of the apron portion 129 can vary between about 10° and 180° about the longitudinal axis of the nacelle 116. As shown in FIG. 10, the apron portion 129 can span an angle θ of between about 85° and about 95°, for example, 90°, about the longitudinal axis of the nacelle 116. Of course, the angular span θ may affect the lateral width of the apron portion 129 and the distance between the tracks 151a, 151b. As such, the angular span θ may be selected to provide for stable support of one or more translatable and/or rotatable components of the nacelle.

FIGS. 12A-12D show an embodiment of an engaging structure 350 having a first component and a second component. In this embodiment, the first component includes a continuous and/or intermittent track 351 and the second component includes a slider 353. The engaging structure 350 can be used with a nacelle to slidably couple two or more components together. For example, the first component can be coupled to the top cowling of the nacelle and the second component can be coupled to the inlet cowling.

In some embodiments, the track 351 includes one or more C-shaped fittings 335 for gripping a bushing 333. Collectively, the fittings 335 and the bushing 333 form a longitudinally extending channel 337. An elongate slider bar 341 extends through the channel 337. Thus, the channel 337 guides movement of the slider bar 341 relative to the track 351.

In some embodiments, the fittings 335 are secured relative to a top cowling of a nacelle. A web 343 is coupled to the slider bar 341 and secured to one or more other components of the nacelle, e.g., an inlet cowling, outlet cowling, and/or cascade. In this way, the engagement between the track 351 and slider 353 provides for the translation of one or more components of the nacelle relative to the top cowling and further supports the translated component when in the translated position.

In some embodiments, the web 343 can include one or more notches or openings 345 that can be indexed relative to fingers or protrusions 334 of the fittings 335. As shown in FIGS. 12A and 12B, when the openings 345 are indexed with the fingers 334, the web 343 can be rotated relative to the track 351 such that the fingers 334 extend at least partially through the openings 345 thereby inhibiting longitudinal movement of the slider 353 relative to the track 351. Similarly, as shown in FIGS. 12C and 12D, the slider 353 can be rotated in the opposite direction relative to the track 351 to disengage the openings 345 and the fingers 334 to allow for the longitudinal translation of the slider 353 relative to the track 351. As shown, when the openings 345 are not indexed with the fingers 334, the slider 353 cannot rotate relative to the track 351 and longitudinal movement of the slider 353 relative to the track 351 is not inhibited by the fingers 334.

Figure 13:
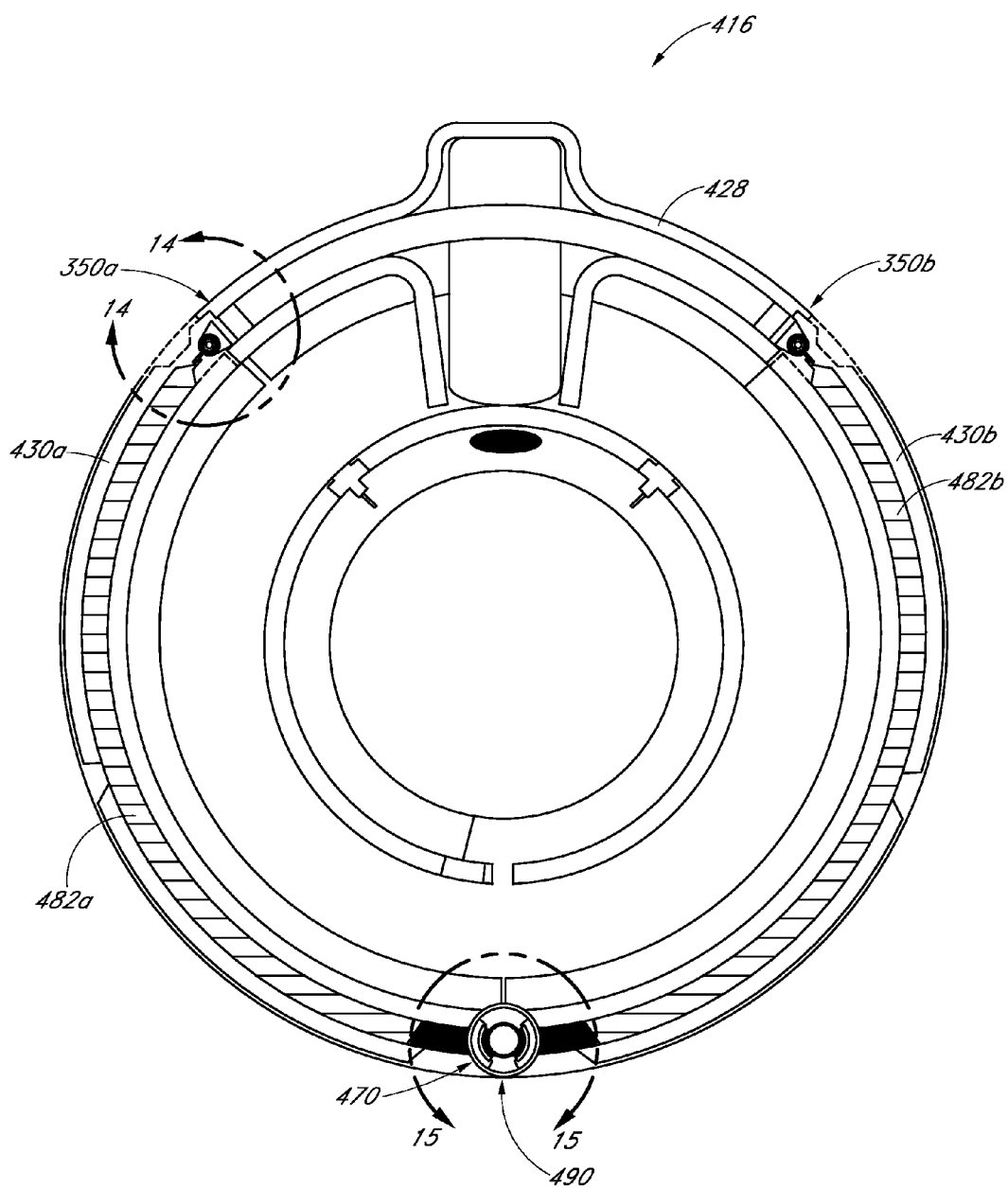
FIG. 13 is a cross-sectional view of a nacelle according to one embodiment.
Figure 14:
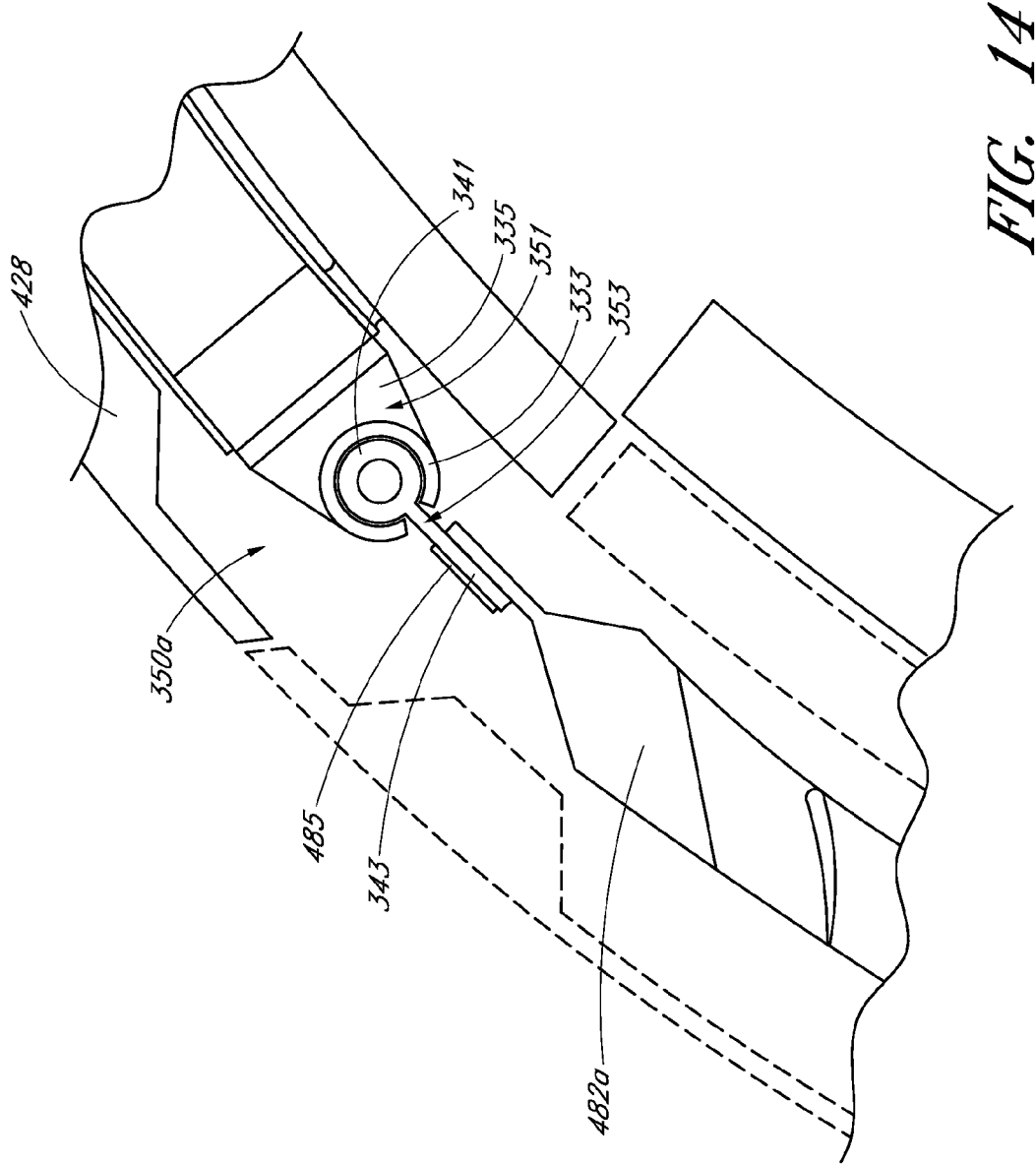
FIG. 14 is a close-up view of a portion of FIG. 13 showing the engaging structure in the form of a slider and track.

FIG. 13 is a cross-sectional view of a nacelle 416 including a top cowling 428. As with the top cowlings discussed above, the top cowling 428 can extend continuously between the inlet and outlet of the nacelle 416. The top cowling 428 includes a pair of engaging structures 350a, 350b discussed above with reference to FIGS. 12A-12D. As shown more clearly in FIG. 14, the fittings 335 of the track 351 can be secured relative to the top cowling 428 such that the bushing 333 and the fittings 335 form a channel. The slider bar 341 can slide through the channel.

The web 343 can be secured relative to the cascade sleeve 482, for example, by a pin, nut, or other fastener 485. In this way, the cascade sleeves 482a, 482b of the nacelle 416 are secured relative to the top cowling 428 and can translate longitudinally relative to the top cowling 428 via the engaging structures 350a, 350b. Additionally, by indexing the slider 353 relative to the fittings 335, the cascade sleeves can be rotated relative to the top cowling 428, if desired.

With reference to FIG. 13, the cascade 482 and outer cowling 430 include opposing sleeves 482a, 482b that are separated from one another by the longitudinal split 490 at the bottom side of the nacelle 416; similarly, the sleeves 430a, 430b are separated from each other by the longitudinal split 490. As a result, the cascade sleeves 482a, 482b can rotate relative to the top cowling 428 and/or translate longitudinally relative to the top cowling 428 independently from one another. Additionally, the nacelle 416 can include a latch mechanism 470 to couple the cascade sleeves 482a, 482b to each other such that the sleeves may be translated together relative to the top cowling 428. In some embodiments, the outer cowling sleeves 430a, 430b can be rotated and/or translated relative to the top cowling 428 independent of the cascade sleeves 482a, 482b. Although illustrated in FIGS. 13 and 14 as coupled to the cascade sleeves 482a, 482b, the engaging structure 350 of FIGS. 12A-12D can be used with other components as well. For example, engaging structures 350 can be coupled to the outlet cowling sleeves, inlet cowling sleeves, and/or VAFN of a nacelle.

Figure 15A:
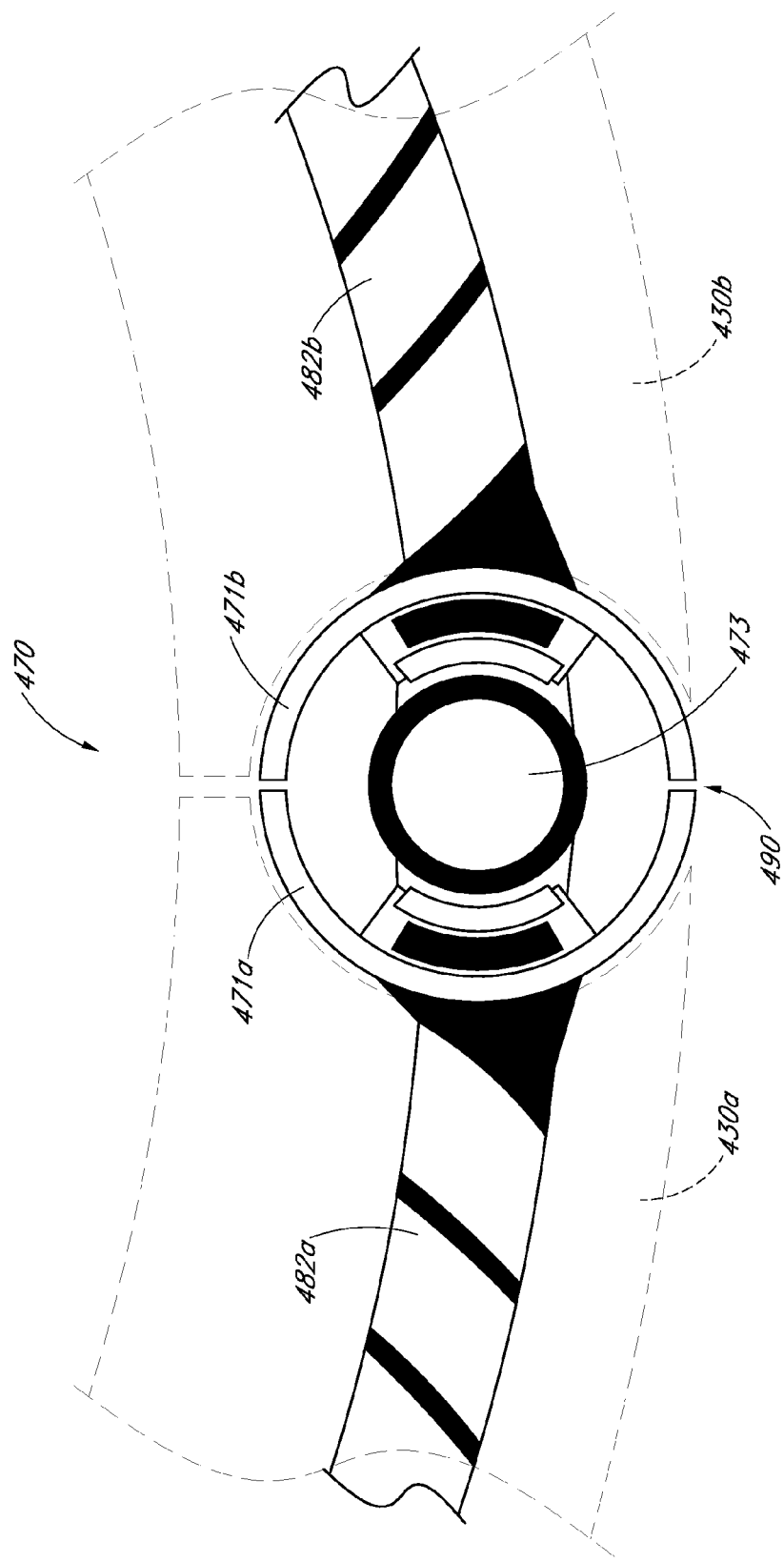
FIG. 15A is a close-up view of a portion of FIG. 13 showing a capture device.
Figure 15B:
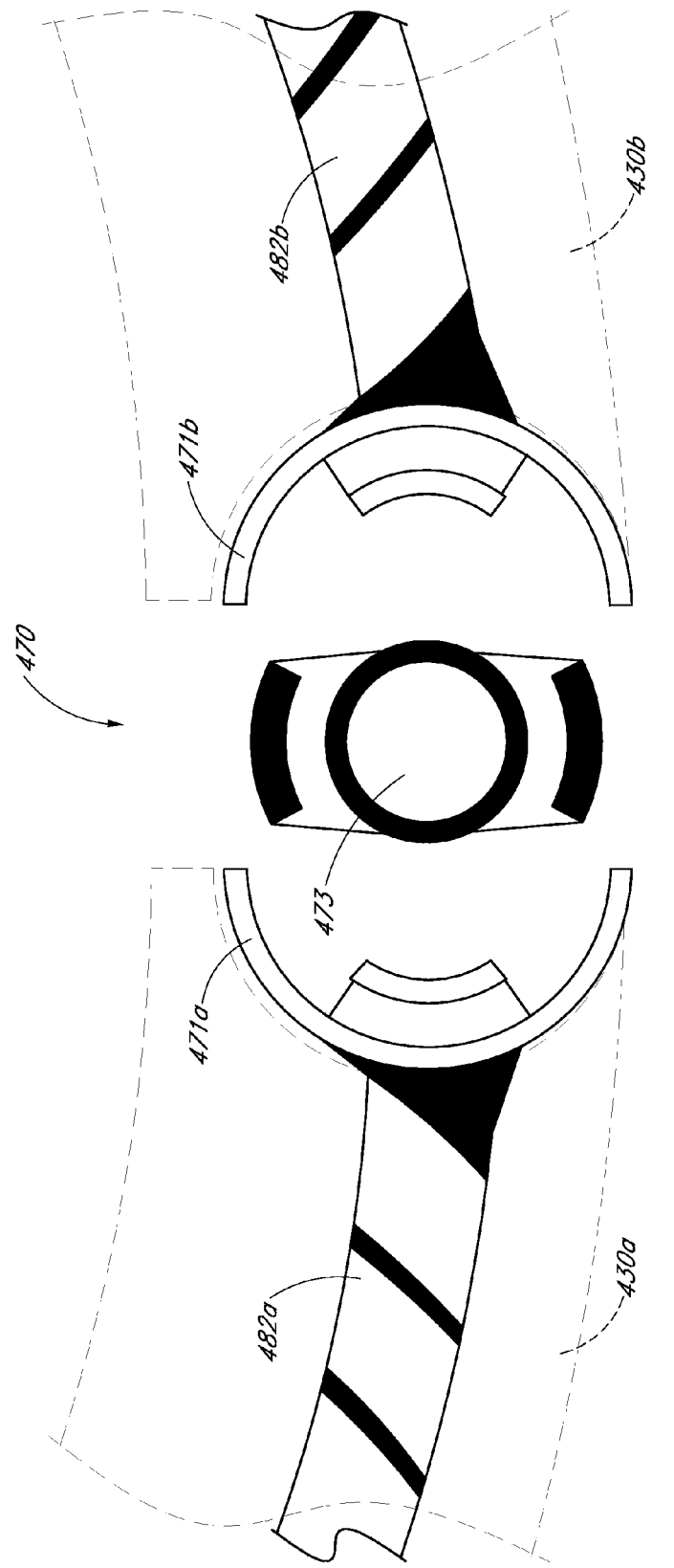
FIG. 15B illustrates the capture device of FIG. 15A with the outlet cowling sleeves separated from the capture device.

As shown in FIG. 15A, the latch mechanism 470 includes a capture device 473 that can be suspended from a fixed component of the nacelle, e.g., a fan case. The capture device 473 is disposed between ends of the cascade sleeves 482a, 482b. Each cascade sleeve 482a, 482b includes a C-shaped clasp 471 that can receive at least a portion of the capture device 473. As shown in FIGS. 15A and 15B, the capture device 473 can be rotated between at least a first configuration (FIG. 15A) and a second configuration (FIG. 15B) with the cascade sleeves 482a, 482b being secured relative to one another via the latch mechanism 470 in the first configuration and being independently movable relative to one another in the second configuration. In this way, the latch mechanism 470 can be used to releasably secure movable sleeve components of the nacelle 416 relative to each other such that the components can be translated longitudinally together relative to the top cowling 428, for example.

Figure 16:
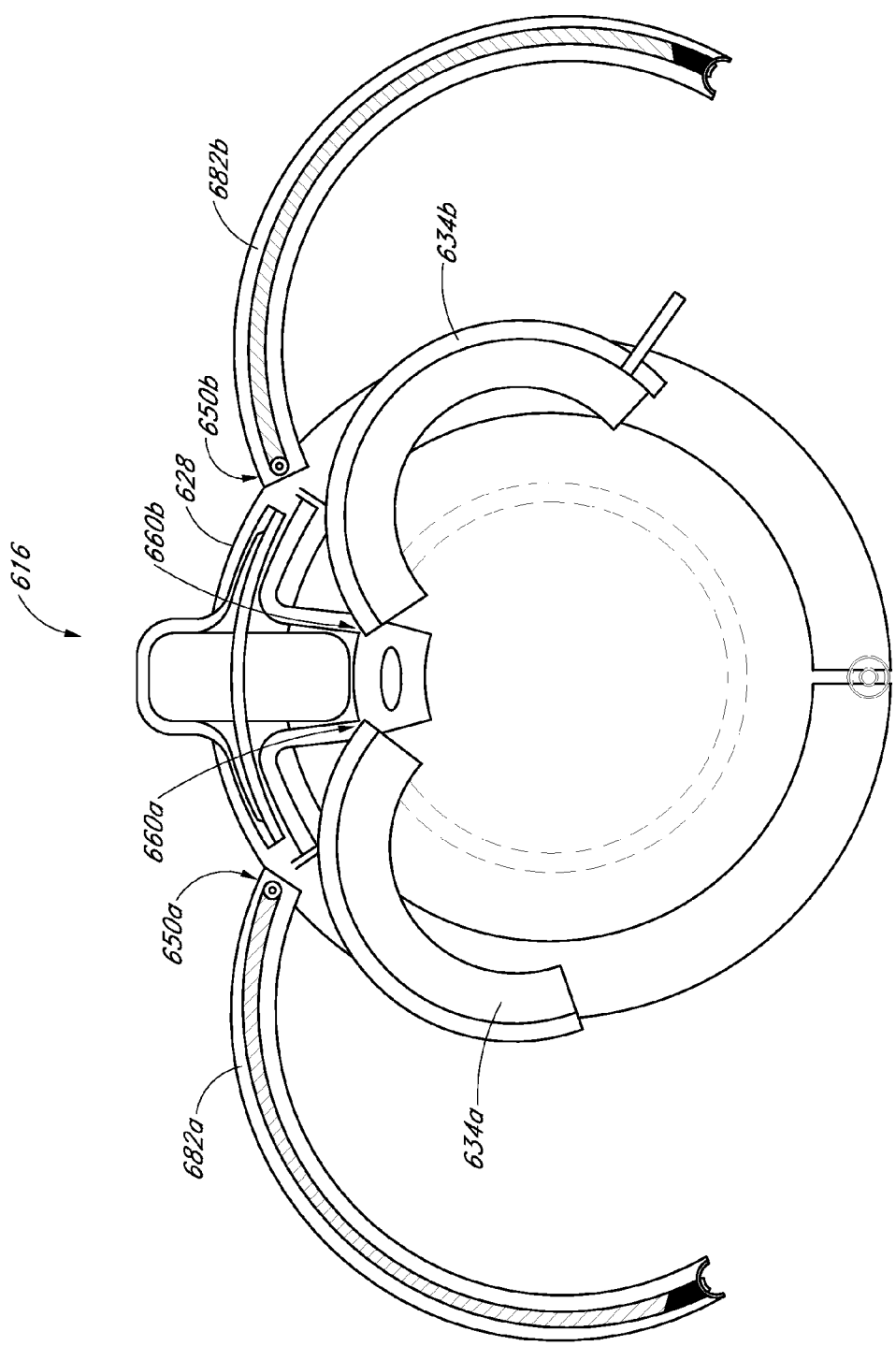
FIG. 16 is a cross-sectional view of a nacelle according to another embodiment.

Turning now to FIG. 16, a cross-sectional view of another embodiment of a nacelle 616 is shown including a top cowling 628. Top cowling 628 can extend continuously in the longitudinal direction between the inlet and outlet of the nacelle 616. Additionally, the top cowling 628 includes a first set of engaging structures 650a, 650b disposed on opposite lateral sides of the top cowling and a second set of engaging structures 660a, 660b disposed on opposite lateral sides of the top cowling 628. Each engaging structure 650, 660 can provide for the longitudinal translation of one or more components of the nacelle 616, e.g., an inlet cowling, an outlet cowling, a core cowling, and/or a cascade, relative to the top cowling 628. Additionally, each engaging structure 650, 660 can provide for the rotation of such components relative to the top cowling 628.

Figure 17:
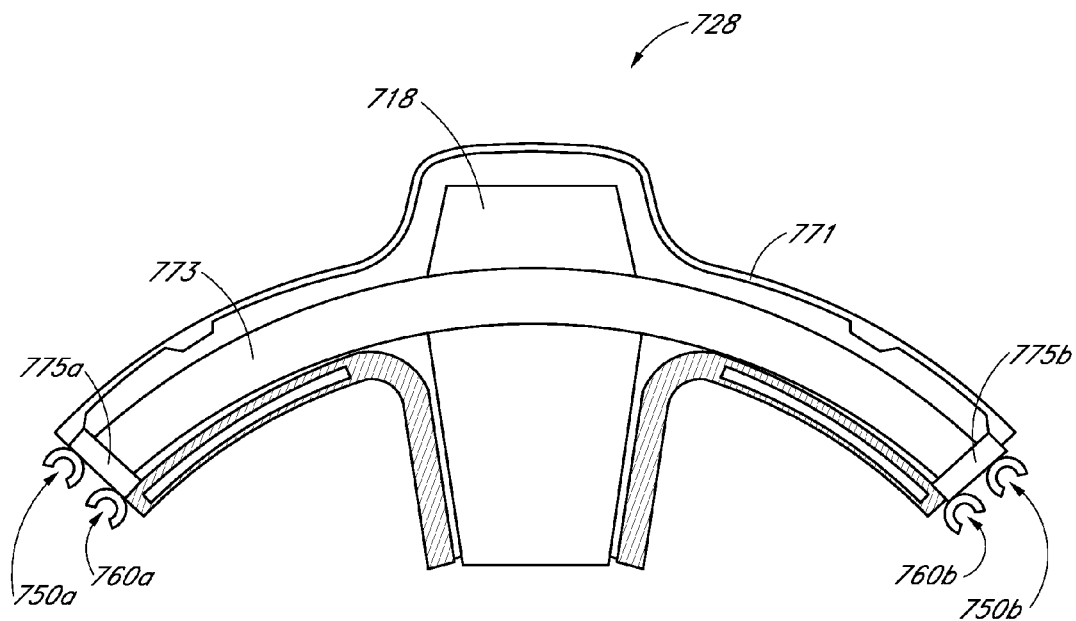
FIG. 17 is a cross-sectional view of a top cowling according to one embodiment.

FIG. 17 is a cross-sectional view of a top cowling 728 according to another embodiment. As with the top cowlings discussed above, the top cowling 728 can extend continuously in the longitudinal direction between the inlet and outlet of a nacelle. In this way, the top cowling 728 may support other components of the nacelle that translate longitudinally and/or rotate relative to the top cowling 728. Such other components, e.g., an inlet cowling, an outlet cowling, a cascade, and/or a core cowling, can be coupled to the top cowling 728 via engaging structures 750, 760. The top cowling 728 includes an outer fairing structure 771 disposed over an outrigger structure 773 and a pylon 718. As shown, the outrigger structure 773 is coupled to beams 775a, 775b to structurally support the engaging structures 750, 760 relative to the pylon 718. In this embodiment, the fairing structure 771 may form an aerodynamic outer surface of the top cowling 728 without structurally supporting the beams 775a, 775b.

Figure 18:
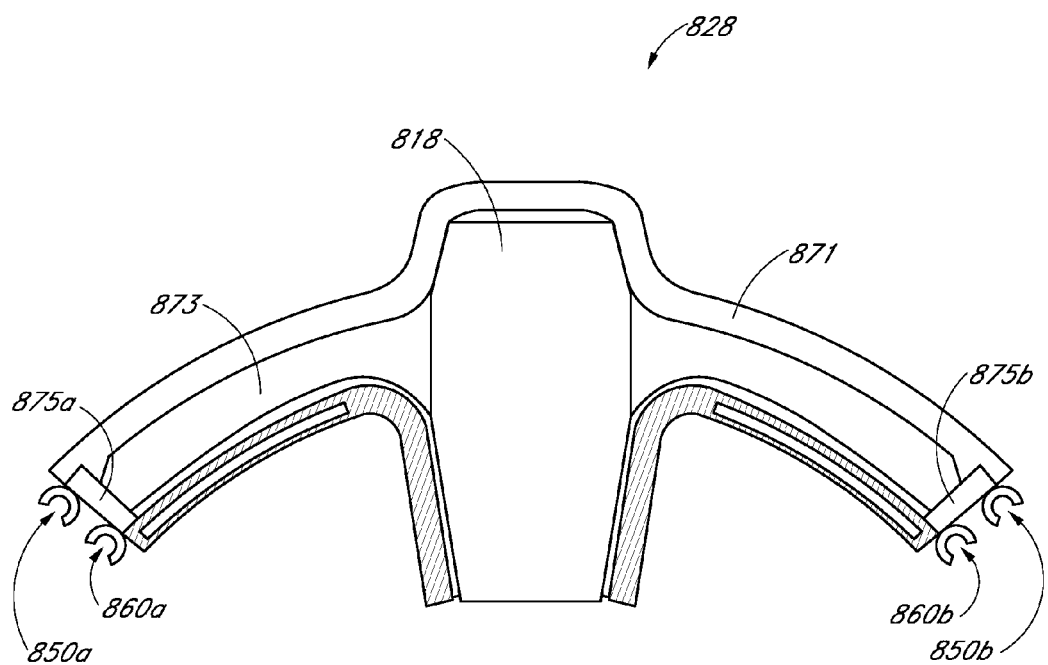
FIG. 18 is a cross-sectional view of a top cowling according to another embodiment.

FIG. 18 is a cross-sectional view of a top cowling 828 according to another embodiment. The top cowling 828 includes engaging structures 850, 860 that are structurally supported relative to a pylon 818 by an outrigger structure 873 and beams 875a, 875b. In contrast to the top cowling of FIG. 17, the fairing structure 871 is also coupled to the beams 875a, 875b to provide additional structural support between the engaging structures 850, 860 and the pylon 818.

Figure 19A:
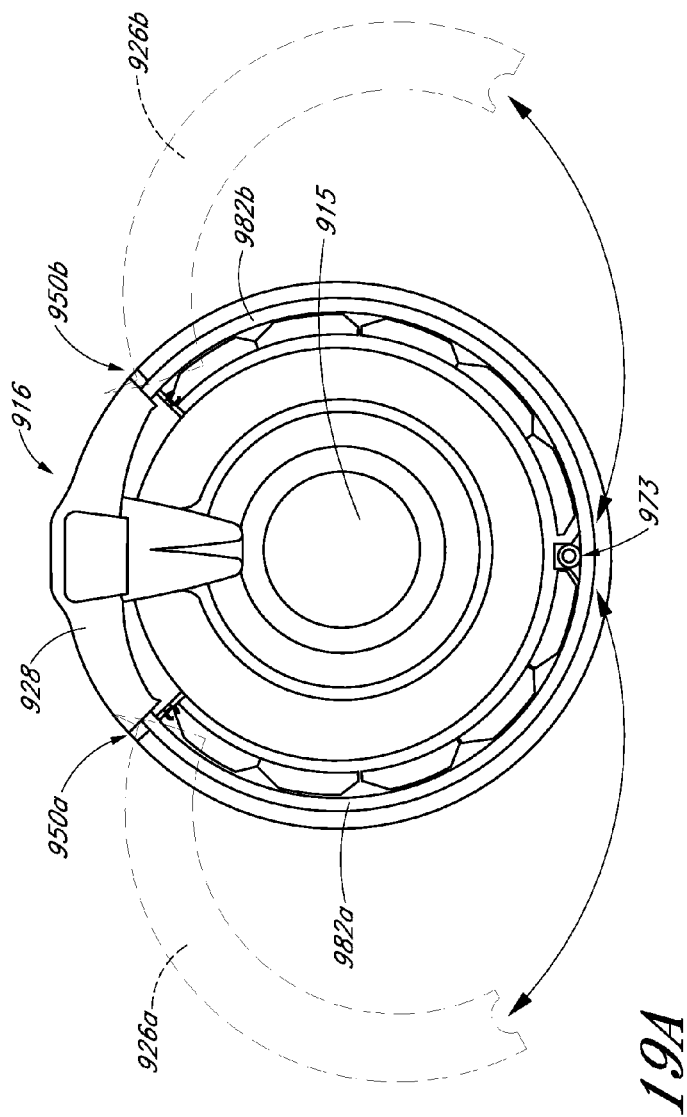
FIG. 19A is a cross-sectional view of a nacelle according to another embodiment.

FIG. 19A is a cross-sectional view of a nacelle 916 according to another embodiment. The nacelle 916 includes a top cowling 928, engaging structures 950a, 950b disposed on opposite lateral sides of the top cowling 928, and inlet cowling sleeves 926a, 926b that are rotatable and longitudinally translatable relative to the top cowling 928. In this way, the inlet cowling sleeves 926a, 926b can be rotated and/or translated longitudinally relative to the top cowling 928 to provide access to portions of the engine 915 disposed within the nacelle 916.

Figure 19B:
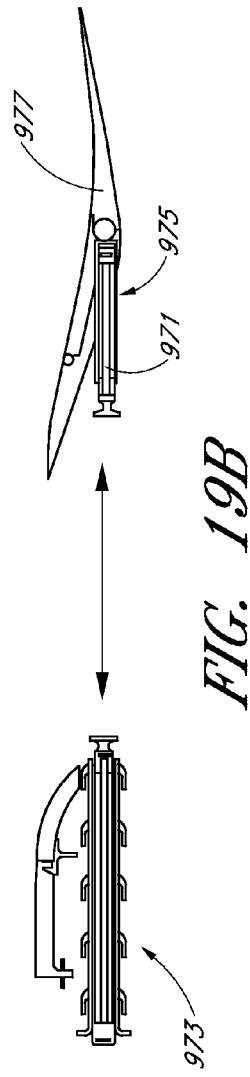
FIG. 19B is a side view of an actuator device for use with the nacelle of FIG. 19A.

The nacelle 916 also includes a capture device 973 configured to releasably secure the inlet cowling sleeves 926a, 926b to one another. As shown in FIG. 19B, the capture device 973 can be coaxially aligned with one or more actuators 975. For example, an actuator 975 including a stroke 971 can be coupled to the capture device 973 and configured to translate the VAFN 977 of the nacelle 916 relative to the top cowling 928. In this way, the capture device 973 can provide a stationary structure from which actuators may translate (e.g., in flight) and/or rotate (e.g., for on-ground service) one or more components of the nacelle 916 relative to the top cowling 928 in flight and/or on the ground for inspection or service purposes.

Figure 19C:
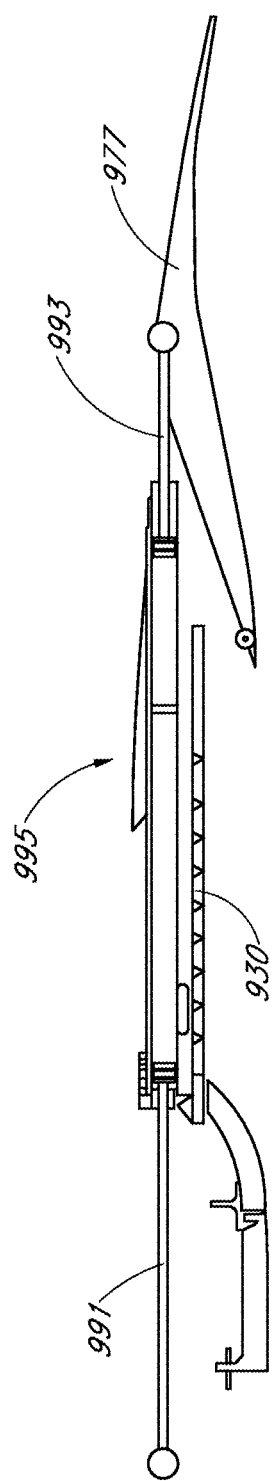
FIG. 19C is a side view of another actuator device for use with the nacelle of FIG. 19A.

FIG. 19C shows an example of an actuator 995 that may be aligned with one of the engaging structures 950 of the nacelle 916. The actuator 995 can include a first stroke 991 configured to translate the outlet cowling 930 and/or cascade array 982 relative to another structure of the nacelle 916, for example, the top cowling or inlet cowling. In some embodiments, the first stroke 991 will only translate the cowling but it will not inhibit its rotation by independent action. The actuator 995 also includes a second stroke 993 configured to translate the VAFN 977 relative to the outlet cowling 930 and/or top cowling. The second stroke 993 can also be configured to allow the outlet cowling 930 and cascade array 982 to translate and/or rotate independently relative to the top cowling 928. By coaxially aligning two or more actuator strokes with one or more engaging structures 950 of the nacelle 916, multiple components of the nacelle may be independently translated longitudinally and/or rotated relative to the top cowling 928.

Figure 20:
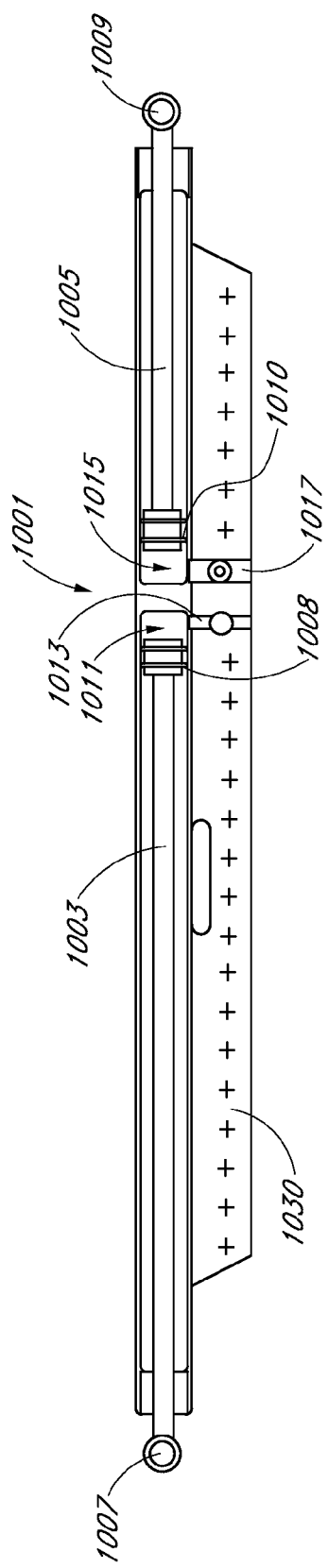

FIGS. 20-22 show embodiments of actuator devices that can be coaxially aligned with one or more engagement structures in a nacelle to translate and/or rotate components of the nacelle. FIG. 20 shows a first example of an actuator device 1001 including a first actuator stroke 1003 and a second actuator stroke 1005. As shown, the first actuator stroke 1003 is disposed adjacent to a hydraulic chamber 1011 which receives one or more pressurized fluids through an inlet lumen 1013. Similarly, the second actuator stroke 1005 is disposed adjacent to a hydraulic chamber 1015 which receives one or more pressurized fluids through an inlet lumen 1017. In this way, each actuator stroke 1003, 1005 can be hydraulically driven between at least two positions.

The first actuator stroke 1003 includes a free end 1007 that can be secured to one or more components of a nacelle, e.g., a top cowling and/or inlet cowling and the opposite end 1008 of the actuator stroke 1003 slides within the outlet cowling 1030 of the nacelle. Thus, the actuation of the first actuator stroke 1003 can cause the outlet cowling 1030 to translate relative to the component of the nacelle secured to the free end 1007.

The second actuator stroke 1005 includes a free end 1009 that can be secured to one or more components of the nacelle, e.g., a VAFN cowling, and the opposite end 1010 of the actuator stroke 1005 slides within the outlet cowling 1030 of the nacelle. Accordingly, the actuator device 1001 can cause two or more components (e.g., the outlet cowling 1030 and the VAFN cowling) to translate and/or rotate relative to other components of the nacelle. Although FIG. 20 illustrates an actuator device 1001 that can be hydraulically driven, the skilled artisan will appreciate that other means of driving one or more components of the actuator device may be utilized. For example, in some embodiments, an actuator device can include one or more electric actuators.

FIG. 21 shows an actuator device 1201 including a first actuator stroke 1203 and a second actuator stroke 1205. As shown, the first actuator stroke 1203 can be rotatably driven by a first flex shaft 1212 such that the stroke 1203 translates and rotates relative to an outlet cowling 1230. Additionally, the second actuator stroke 1205 is disposed adjacent to a hydraulic chamber 1215 formed in the outlet cowling 1230 which receives one or more pressurized fluids through an inlet lumen 1217. In this way, each actuator stroke 1203, 1205 can be actuated between at least two positions.

The first actuator stroke 1203 includes a free end 1207 that can be secured to one or more components of a nacelle, e.g., a top cowling and/or inlet cowling and the opposite end 1208 of the actuator stroke 1203 translates and rotates within the outlet cowling 1230 of the nacelle. Thus, the actuation of the first actuator stroke 1203 can cause the outlet cowling 1230 to translate and/or rotate relative to the component of the nacelle that is secured to the free end 1207. The second actuator stroke 1205 includes a free end 1209 that can be secured to one or more components of the nacelle, e.g., a VAFN cowling, and the opposite end 1210 of the actuator stroke 1205 slides within the outlet cowling 1230 of the nacelle. Accordingly, the actuator device 1201 can cause two or more components (e.g., the outlet cowling 1230 and the VAFN cowling) to translate and/or rotate relative to other components of the nacelle.

FIG. 22 shows an actuator device 1301 including a first actuator stroke 1303 and a second actuator stroke 1305. As shown, the first actuator stroke 1303 can be rotatably driven by a first flex shaft 1312 such that the stroke 1303 translates and rotates relative to an outlet cowling 1330. Additionally, the second actuator stroke 1305 can be rotatably driven by a second flex shaft 1311 such that the stroke 1303 translates and rotates relative to the outlet cowling 1330. Accordingly, the actuator device 1301 can cause two or more components (e.g., the outlet cowling 1330 and the VAFN cowling) to translate and/or rotate relative to other components of the nacelle.

Although the actuator devices of FIGS. 20-22 are described with respect to an outlet cowling and VAFN cowling, it will be appreciated that the actuator devices disclosed herein can be aligned with engagement structures of a nacelle to provide for the relative translation and/or rotation of any component or components relative to other components of the nacelle.

The skilled artisan will recognize the interchangeability of various features from different embodiments. Although these techniques and systems have been disclosed in the context of certain embodiments and examples, it will be understood by those skilled in the art that these techniques and systems may be extended beyond the specifically disclosed embodiments to other embodiments and/or uses and obvious modifications and equivalents thereof. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the systems disclosed herein disclosed should not be limited by the particular disclosed embodiments described above.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by any presented claims rather than by the foregoing description. All variations coming within the meaning and range of equivalency of presented claims are embraced within their scope.

What is claimed is:

1. A nacelle having an inlet, an outlet, and a longitudinal axis extending therebetween, the nacelle comprising:
   a top cowling disposed on a top portion of the nacelle, defining a first portion of the inlet and a first portion of the outlet of the nacelle, the top cowling extending longitudinally between the inlet and the outlet,
   a pylon structurally integrated with the top cowling, the top cowling having a lateral width bordered by an inboard longitudinal split and an outboard longitudinal split, the lateral width spanning between 20 degrees and 90 degrees of the circumference of the inlet, wherein the lateral width of the pylon is less than the lateral width of the top cowling;
   an outlet cowling defining a second portion of the outlet, the outlet cowling comprising a first half rotatably coupled to the inboard side of the top cowling and a second half rotatably coupled to the outboard side of the top cowling, the outlet cowling configured to translate aft along the longitudinal axis;
   an inlet cowling defining a second portion of the inlet and comprising a third half and a fourth half, the third half rotatably coupled to the inboard side of the top cowling and disposed forward of the first half and a the fourth half rotatably coupled to the outboard side of the top cowling and disposed forward of the second half, and
   a cascade disposed radially inward of the outlet cowling, the cascade configured to longitudinally translate with respect to the top cowling;
   a latch mechanism comprising:
      a capture device;
      a first C-shaped clasp coupled to a first cascade sleeve; and
      a second C-shaped clasp coupled to a second cascade sleeve,
      wherein the first C-shaped clasp and the second C-shaped clasp are configured to receive the capture device,
      wherein the capture device is rotatable between a first position in which the first cascade sleeve and the second cascade sleeve are secured together, and a second position in which the first cascade sleeve and the second cascade sleeve are independently movable,
   wherein the top cowling includes an engaging structure configured to guide the longitudinal movement of the inlet cowling,
   wherein the top cowling and the inlet cowling are slidably engaged by the engaging structure, the engaging structure comprising a track portion comprising a channel and a slider portion slidably disposed within the channel, wherein the channel guides movement of the slider portion relative to the track portion, wherein the track portion is coupled to the top cowling, and the slider portion is coupled to the inlet cowling,
   wherein the nacelle comprises a transverse split disposed between the inlet cowling and the outlet cowling,
   wherein the top cowling distances the inboard longitudinal split, the outboard longitudinal split, and the transverse split from the pylon by at least 10 degrees.

2. The nacelle of claim 1 wherein the outlet cowling encloses a thrust reverser system comprising the cascade.

3. The nacelle of claim 1, wherein the outlet cowling includes a translating sleeve.

4. The nacelle of claim 1 wherein at least one of the inlet cowling and the outlet cowling can be translated to provide access to an engine disposed within the nacelle.

5. The nacelle of claim 4, the engaging structure further providing for rotation of the at least one of the inlet cowling and the outlet cowling.

6. A nacelle having an inlet, an outlet, and a longitudinal axis extending therebetween, the nacelle comprising:
   a top cowling disposed on a top portion of the nacelle and extending between and at least partially defining the inlet and at least partially defining the outlet;
   an inlet cowling at least partially defining the inlet, the inlet cowling being configured to longitudinally translate relative to the top cowling;
   a third cowling at least partially defining the outlet, and
   a cascade disposed radially inward of the third cowling, the cascade configured to longitudinally translate with respect to the top cowling;
   a latch mechanism comprising:
      a capture device;
      a first C-shaped clasp coupled to a first cascade sleeve; and
      a second C-shaped clasp coupled to a second cascade sleeve,
      wherein the first C-shaped clasp and the second C-shaped clasp are configured to receive the capture device,
      wherein the capture device is rotatable between a first position in which the first cascade sleeve and the second cascade sleeve are secured together, and a second position in which the first cascade sleeve and the second cascade sleeve are independently movable,
   wherein the top cowling includes an engaging structure configured to guide the longitudinal translation of at least one of the inlet cowling and the third cowling, wherein the engaging structure further provides for rotation of at least one of the inlet cowling and the third cowling,
   wherein the top cowling and the inlet cowling are slidably engaged by the engaging structure, the engaging structure comprising a track portion comprising a channel and a slider portion slidably disposed within the channel, wherein the channel guides movement of the slider portion relative to the track portion, wherein the track portion is coupled to the top cowling, and the slider portion is coupled to the inlet cowling,
   wherein the nacelle comprises an inboard longitudinal split and an outboard longitudinal split, each disposed between the top cowling and the inlet and outlet cowling, and a transverse split disposed between the inlet cowling and the outlet cowling,
   wherein the top cowling extends from the inboard longitudinal split to the outboard longitudinal split and spans a lateral width of between 20 degrees and 90 degrees of a circumference of the inlet.

7. The nacelle of claim 6, wherein the inlet cowling comprises at least two sleeves, each sleeve being independently rotatable relative to the top cowling.

8. The nacelle of claim 6, wherein the third cowling comprises at least two sleeves, each sleeve being independently rotatable relative to the top cowling.

9. The nacelle of claim 8, wherein each of the at least two sleeves is independently translatable relative to the top cowling.

10. The nacelle of claim 6 the engaging structure having a first component and a second component slidable relative to the first component, the first component being secured relative to the top cowling and the second component being secured relative to the inlet cowling.

11. The nacelle of claim 6 the engaging structure having a first component and a second component slidable relative to the first component, the first component being secured relative to the top cowling and the second component being secured relative to the third cowling.

12. A nacelle having an inlet, an outlet, and a longitudinal axis extending therebetween, the nacelle comprising:
   a first cowling disposed on a top portion of the nacelle, at least partially defining the inlet and at least partially defining the outlet; and
   a second cowling slidingly and rotatably coupled to and supported by the first cowling so as to move between at least a first longitudinal position and a second longitudinal position, the second cowling defining at least a portion of the inlet when in the first position;
   a latch mechanism comprising:
      a capture device;
      a first C-shaped clasp coupled to a first cascade sleeve; and
      a second C-shaped clasp coupled to a second cascade sleeve,
      wherein the first C-shaped clasp and the second C-shaped clasp are configured to receive the capture device,
      wherein the capture device is rotatable between a first position in which the first cascade sleeve and the second cascade sleeve are secured together, and a second position in which the first cascade sleeve and the second cascade sleeve are independently movable,
   wherein the first longitudinal position and the second longitudinal position are on the same axis,
   wherein the first cowling includes an engaging structure configured to guide the longitudinal movement of the second cowling,
   wherein the first cowling and second cowling are slidably engaged by the engaging structure, the engaging structure comprising a track portion comprising a channel and a slider portion slidably disposed within the channel, wherein the channel guides movement of the slider portion relative to the track portion, wherein the track portion is coupled to the first cowling, and the slider portion coupled to the second cowling,
   wherein the first cowling extends along an entire length of the nacelle, and
   wherein the first cowling spans a lateral width of between 20 degrees and 90 degrees of a circumference of the inlet.

13. The nacelle of claim 12, wherein the second cowling extends forward of the first cowling when in the second position.

14. The nacelle of claim 12, wherein the second cowling comprises at least two sleeves, each sleeve being independently rotatable relative to the first cowling.

15. The nacelle of claim 12 further comprising a third cowling, the third cowling defining a portion of the outlet.

16. The nacelle of claim 15, wherein the third cowling comprises at least two sleeves, each sleeve being independently translatable relative to the first cowling.

17. The nacelle of claim 16, wherein the at least two sleeves are independently rotatable relative to the first cowling.

18. The nacelle of claim 15 further an engaging structure configured to guide the longitudinal movement of the third cowling.

\* \* \* \* \*